United States Patent
Toyama

(10) Patent No.: US 9,272,213 B2
(45) Date of Patent: Mar. 1, 2016

(54) GAME OPERATION DEVICE, GAME OPERATION METHOD, COMPUTER-READABLE RECORDING MEDIUM, AND GAME OPERATION SYSTEM

(75) Inventor: Akira Toyama, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 120 days.

(21) Appl. No.: 14/115,443

(22) PCT Filed: May 8, 2012

(86) PCT No.: PCT/JP2012/003002
§ 371 (c)(1),
(2), (4) Date: Nov. 4, 2013

(87) PCT Pub. No.: WO2012/153519
PCT Pub. Date: Nov. 15, 2012

(65) Prior Publication Data
US 2014/0073416 A1    Mar. 13, 2014

(30) Foreign Application Priority Data
May 11, 2011 (JP) ................. 2011-106007

(51) Int. Cl.
| A63F 9/24 | (2006.01) |
| A63F 13/00 | (2014.01) |
| G06F 17/00 | (2006.01) |
| G06F 19/00 | (2011.01) |

(Continued)

(52) U.S. Cl.
CPC ............... *A63F 13/12* (2013.01); *A63F 13/792* (2014.09); *A63F 13/822* (2014.09); *G07F 17/3251* (2013.01)

(58) Field of Classification Search
USPC .................. 463/20, 22, 25, 40, 42
See application file for complete search history.

(56) References Cited

U.S. PATENT DOCUMENTS

2002/0193099 A1* 12/2002 Paulsen ................. G07F 17/32 455/414
2003/0078102 A1* 4/2003 Okita et al. .................... 463/42

FOREIGN PATENT DOCUMENTS

| JP | 2001-79270 | 3/2001 |
| JP | 2003-144759 | 5/2003 |

(Continued)

OTHER PUBLICATIONS

Office Action issued May 9, 2014 in corresponding Korean Application No. 10-2013-7003584, with English Summary.

(Continued)

*Primary Examiner* — Adetokunbo O Torimiro
(74) *Attorney, Agent, or Firm* — Wenderoth, Lind & Ponack, L.L.P.

(57) ABSTRACT

A deposit managing unit 22 receives a game player's deposit command transmitted from a terminal device 12 and deposits virtual currency in a deposit amount specified by the game player according to the received deposit command. In addition, the deposit managing unit 22 prohibits the game player from using the virtual currency deposited by the game player until a predetermined deposit period expires. When a depositing game player deposits virtual currency, a benefit offering unit 24 offers the depositing game player a benefit that gives a higher advantage to the depositing game player in battle until the deposit period expires in comparison to a case where the depositing game player does not deposit virtual currency.

7 Claims, 19 Drawing Sheets

(51) Int. Cl.
*A63F 13/30* (2014.01)
*G07F 17/32* (2006.01)
*A63F 13/822* (2014.01)
*A63F 13/792* (2014.01)

(56) References Cited

FOREIGN PATENT DOCUMENTS

| | | |
|---|---|---|
| JP | 2004-33259 | 2/2004 |
| JP | 2006-94877 | 4/2006 |
| JP | 2009-247652 | 10/2009 |
| JP | 2009-254448 | 11/2009 |
| JP | 2010-282356 | 12/2010 |
| JP | 2010-287191 | 12/2010 |
| KR | 2003-32891 | 4/2003 |
| KR | 10-2008-0100070 | 11/2008 |

OTHER PUBLICATIONS

International Search Report issued Jul. 31, 2012 in International (PCT) Application No. PCT/JP2012/003002.
Sengoku Collection, Famitsu Social, Mar. 10, 2011, Shukan Famitsu 3 Gatsu 24 Nichi Go Tokubetsu Furoku, pp. 20-21.

* cited by examiner

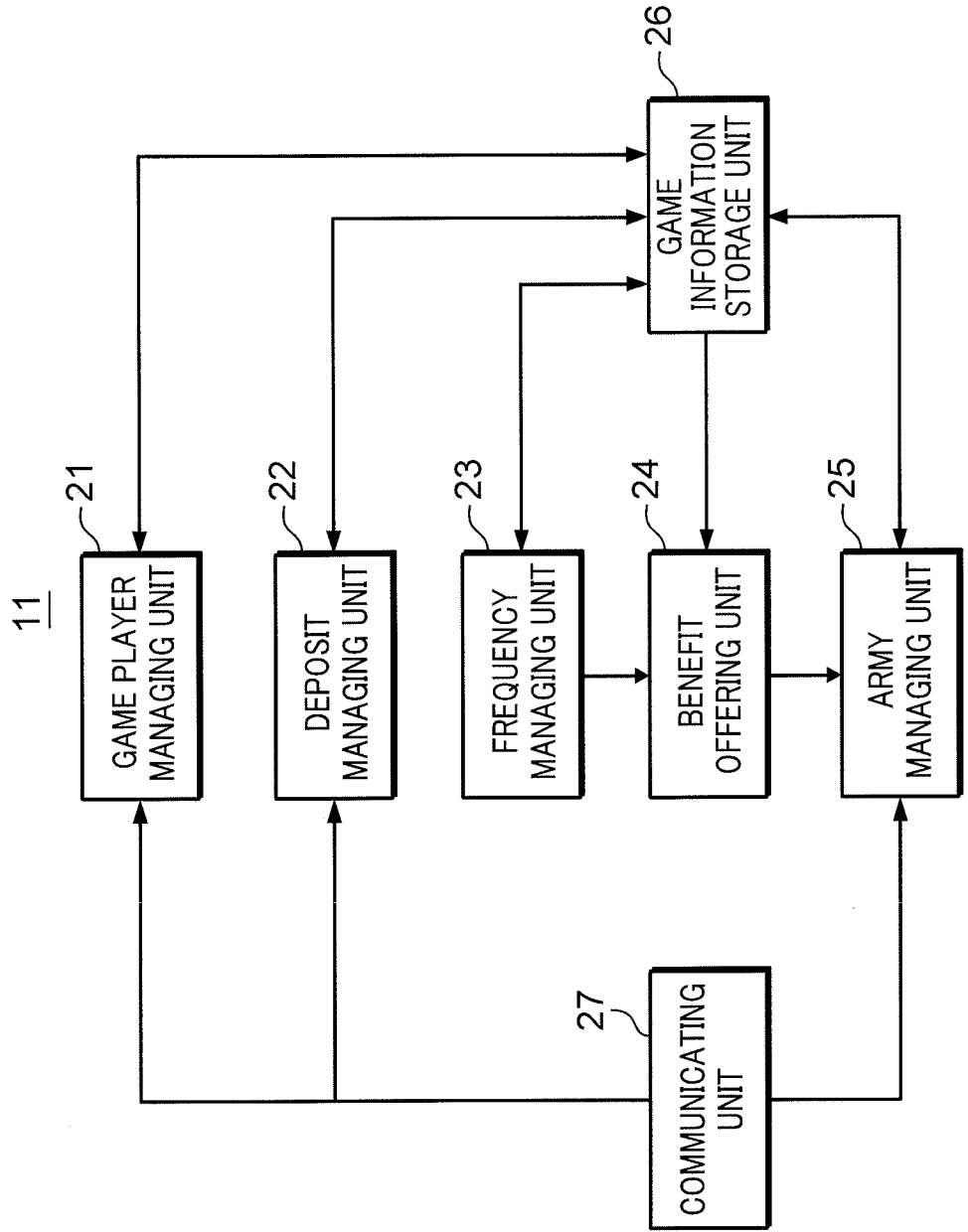

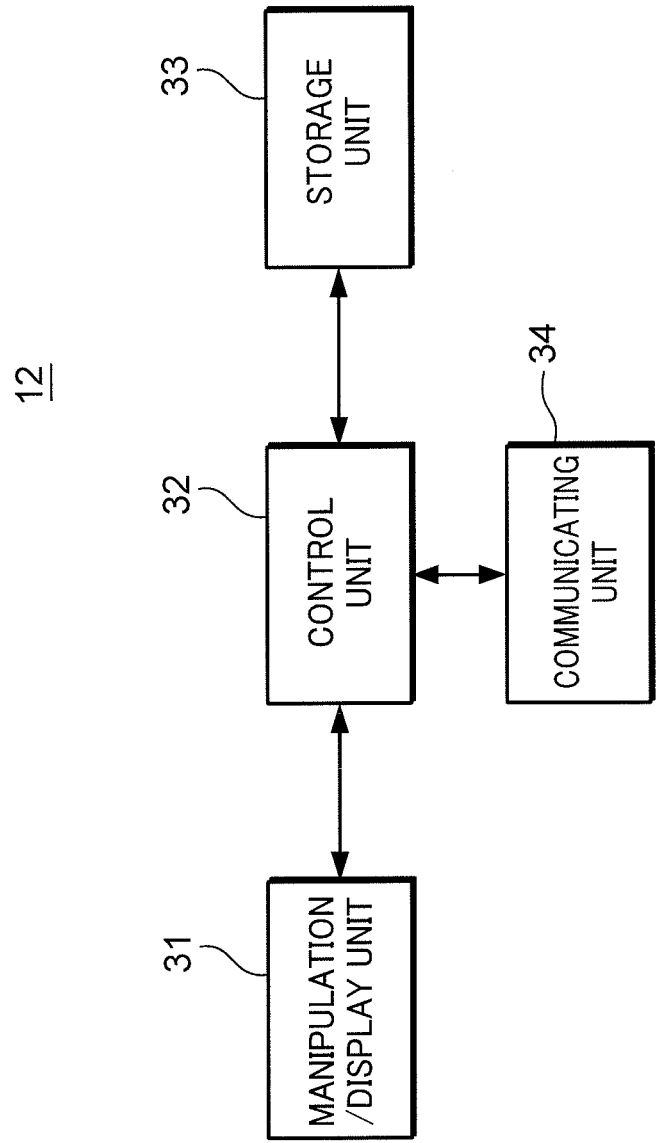

FIG.4

GAME PLAYER INFORMATION DATABASE

| PLAYER ID | PLAYER NAME | REGISTRATION DATE | VIRTUAL CURRENCY |
|---|---|---|---|
| AAA | | | |

HISTORY INFORMATION DATABASE

| PLAYER ID | GAME HISTORY | | FREQUENCY HISTORY |
|---|---|---|---|
| | LOGIN | LOGOUT | Hp=1.0 (2010/3/2/0:00) |
| AAA | 2010/3/4/18:00 | 2010/3/4/18:10 | Hp=0.9 (2010/3/3/0:00) |

DEPOSIT INFORMATION DATABASE

| PLAYER ID | DEPOSIT AMOUNT | DEPOSIT PERIOD | |
|---|---|---|---|
| | | DEPOSIT START DATE | DEPOSIT END DATE |
| AAA | YYY | 2010/2/1 | 2010/3/1 |

ARMY INFORMATION DATABASE

| ARMY ID | ARMY NAME | PLAYER ID | ABILITY SCORE | ITEMS | CARDS | | | | BATTLE HISTORY |
|---|---|---|---|---|---|---|---|---|---|
| | | | | | | CARD ID | CARD LEVEL VALUE | CARD ENERGY VALUE | |
| | | AAA | LEVEL VALUE:xxx | 5 CRYSTAL ITEMS | | C1 | | | 1010/3/4/18:10 (ARMY ID) |
| | | | ENERGY VALUE:YYY | | | C2 | | | |

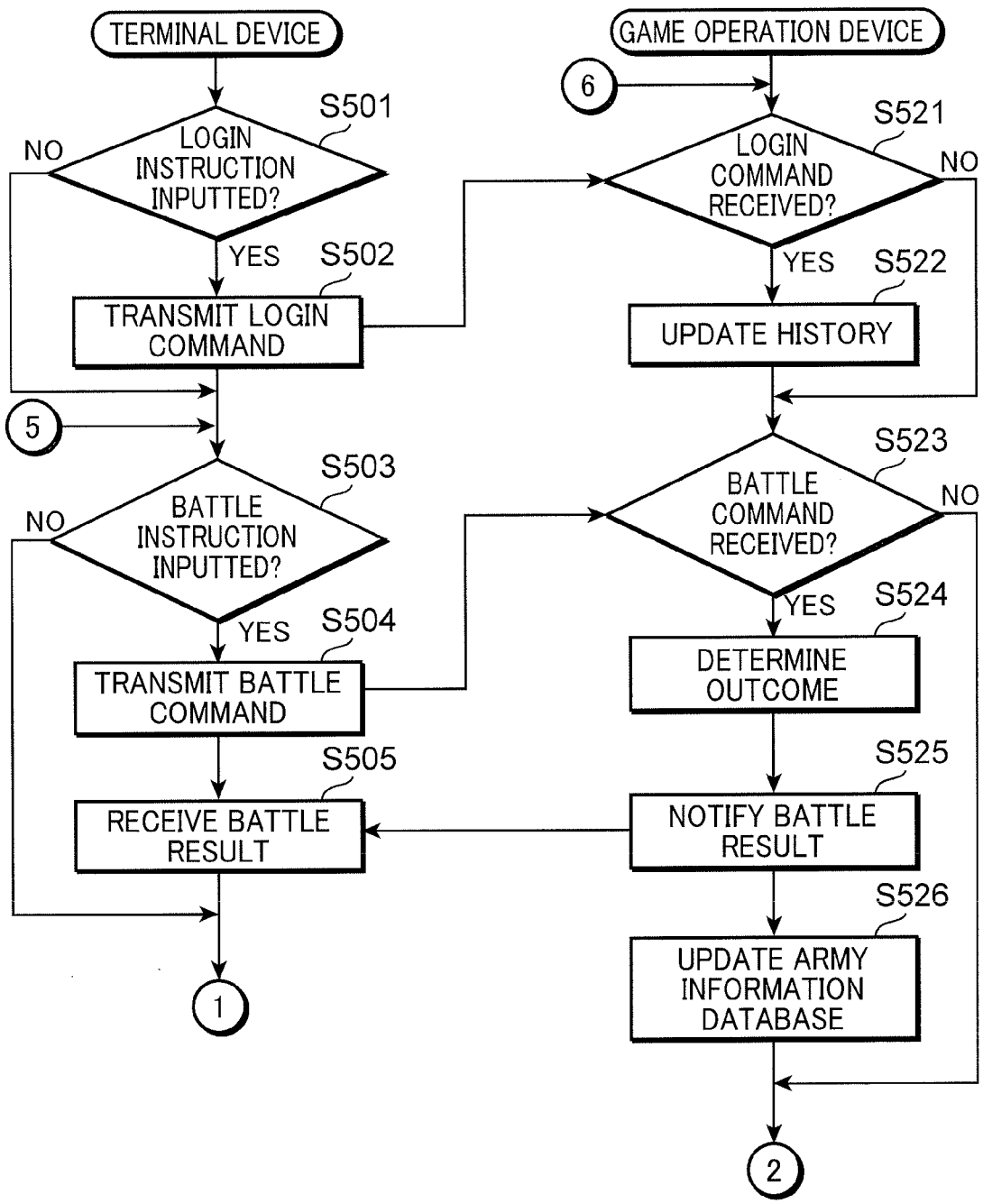

FIG.9

GAME OPERATION DEVICE, GAME OPERATION METHOD, COMPUTER-READABLE RECORDING MEDIUM, AND GAME OPERATION SYSTEM

TECHNICAL FIELD

The present invention relates to a technique to operate a game played through connection via a predetermined communications line to a terminal device manipulated by a game player and which causes assemblies formed of a plurality of units set in a game space to engage in battle with each other.

BACKGROUND ART

Recently, social games which can be readily played outside of the home by a game player using a terminal device such as a mobile phone, a smartphone, or a tablet device have become increasingly widespread. Unlike conventional games in which a game player's skill is an important factor, a social game is usually a game in which an ability score of a team or the like belonging to a game player can be increased solely by simple button manipulations and is a game that can be readily played by a game player. Therefore, social games are often played to pass the time when waiting for a train or when waiting for someone. In addition, while social games also enable teams owned by game players to match up against one another, the outcome of the match-up is also instantaneously determined based on a magnitude relationship between ability scores of the teams owned by the game players regardless of the skills of the game players. Furthermore, results such as an increase or decrease in the ability score of a team and an acquisition or loss of an item are released at the same time as the outcome. Such promptness and simplicity are features of social games.

Another feature of social games is their billing system. For example, a mode is widely adopted where a game player desiring to increase an ability score of a team owned by the game player in an efficient manner is billed as follows. Accordingly, a game operating company which operates a social game forum and a game maker which provides a game of their creation can make profits.

Specifically, a game player purchases an item for increasing the ability score of a team owned by the game player or an item (a drink or medication) for restoring hit points of a character that is a member of the team owned by the game player, and the like.

Items for hit point restoration will now be further described. Obviously, once hit points of a character are reduced to zero, a game player is no longer able to continue the game. However, as time passes without a further change in status, the hit points of the character are gradually regained and the game can be executed one again once the hit points are restored to a predetermined level. However, during this period, since the game player is unable to carry on with the game, the ability score of the team cannot be increased. Therefore, if the game player wishes to increase the abilities of a character as quickly as possible, the game player either executes the game as soon as the hit points are restored or frequently accesses the game in order to check whether the hit points have been restored or not. However, since such methods require a certain amount of time and trouble, the game player may feel a sense of inconvenience. As a result, such a game player purchases an item (a drink or medicine) that restores the hit points of a character or, in other words, the game player buys time with money. In particular, with a social game in which a game is simultaneously executed by a large number of game players, a game player often desires to improve his/her own ranking through enhancing abilities by even the slightest margin over other game players. Therefore, there are cases where a game player chooses to improve abilities quickly or ahead of other game players while being fully aware that he/she is to be billed instead of gradually enhancing abilities over time.

Patent Documents 1 and 2 are disclosed as prior art documents related to the present application. Patent Document 1 discloses a technique to present a game player with items that can be acquired by the game player depending on game status. Patent Document 2 discloses a technique that enables a game player to purchase an item without interrupting a game.

As described above, conventionally, methods of ability improvement in social games can be roughly divided into the following two options: 1. taking time (checking whether or not hit points have been restored in order to enhance abilities efficiently, and increasing frequency of access to the game in order to ensure game continuation); and 2. purchasing an item or the like. However, if there are only these two options, a significant gap is created in the degree of ability improvement between game players with sufficient financial resources who purchase one item or the like after another and game players who simply play the game by taking time. In addition, game players who simply take time tend to think that even if they purchase a certain amount of items, they would fall well short of those who buy items in large quantities after all. Therefore, these game players cannot be motivated to actively purchase items.

Consequently, the present state of social games is that a clear line is being drawn between billable game players and non-billable game players. However, should this state continue, since rankings of non-billable game players would hardly rise, if at all, there is a reasonable possibility that their sense of participation to the game may gradually decline and that they may stop playing the game. In other words, as things stand, a social game system has an intrinsic risk in its inability to provide sufficient motivation for non-billable game players to continue playing.

A conceivable solution to this problem is to provide previously non-billable game players with motivation to become billable players or, in other words, provide a variation in terms of ability improvement which had not been available in conventional games.

Patent Document 1: Japanese Patent Application Laid-open No. 2006-94877
Patent Document 2: Japanese Patent Application Laid-open No. 2010-282356

SUMMARY OF THE INVENTION

In consideration of the above, an object of the present invention is to provide a new ability improvement option that does not simply rely on billing as was conventional in order to realize an attractive game with enough charm and appeal to make a game player want to continue playing.

A game operation device according to an aspect of the present invention is a game operation device for operating a game played through connection via a predetermined communications line to a terminal device manipulated by a game player and which causes assemblies consisting of a plurality of units set in a game space to engage in battle with each other, the game operation device comprising: a deposit managing unit which deposits a virtual currency usable in the game space according to a deposit command issued by the game player and transmitted from the terminal device and which prohibits use of the deposited virtual currency by the game player until a predetermined deposit period expires; and a benefit offering unit which offers, until the deposit period expires, a benefit that gives a higher advantage to the game player in the battle when the game player deposits the virtual currency in comparison to a case where the game player does not deposit the virtual currency.

BRIEF DESCRIPTION OF THE DRAWINGS

FIG. 2 is a block diagram showing a detailed configuration of a game operation device shown in FIG. 1.

FIG. 3 is a block diagram of a terminal device shown in FIG. 1.

FIG. 4 is a diagram showing data structures of databases stored in a game information storage unit shown in FIG. 2.

FIG. 5 is a flow chart showing processing that takes place when a terminal device logs into the game operation device according to an embodiment of the present invention and engages in battle with an enemy army.

FIG. 9 is a screen view of a login screen that is displayed on a terminal device in a game executed by a game operation device according to an embodiment of the present invention.

FIG. 18 are explanatory diagrams of processing by a deposit managing unit when a deposit update command is received, wherein

DESCRIPTION OF EMBODIMENTS

Figure 1:
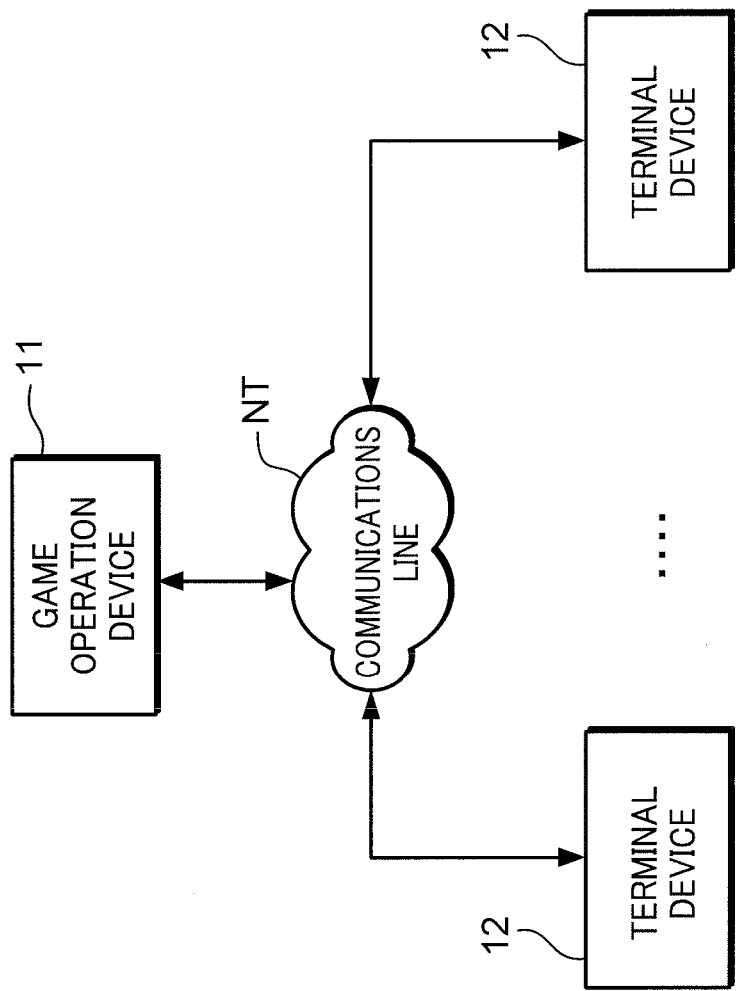
FIG. 1 is an overall configuration diagram of a game system to which a game operation device according to an embodiment of the present invention is applied.

Hereinafter, a game operation device according to an embodiment of the present invention will be described with reference to the drawings. FIG. 1 is an overall configuration diagram of a game system to which a game operation device according to an embodiment of the present invention is applied. As shown in FIG. 1, the game system comprises a game operation device 11 and one or a plurality of terminal devices 12.

The game operation device 11 is constituted by a general computer. The terminal device 12 is constituted by, for example, a mobile information terminal device such as a smartphone or a tablet device.

The game operation device 11 and the terminal device 12 are connected via a communications line NT so as to be able to communicate with each other. A mobile phone network and an Internet communications line are adopted as the communications line NT. For example, unique communication IDs such as IP addresses are assigned to the game operation device 11 and the terminal device 12, and the game operation device 11 and the terminal device 12 communicate with each other using the communication IDs according a communication protocol such as TCP/IP.

The terminal device 12 accepts various instructions from a game player for playing a game, and transmits commands in accordance with the accepted instructions to the game operation device 11 via the communications line NT. The game operation device 11 appropriately executes processing in accordance with the various commands transmitted from the terminal device 12, and conducts the game by appropriately transmitting processing results to the terminal device 12.

In the present embodiment, a social game is adopted as the game. A social game is a game using social application software. Social application software is application software produced for an operating environment (application platform) such as API which runs on a web browser and which is provided on an SNS (social networking service).

Unlike existing online games, a social game does not require dedicated client software and can be used as long as a web browser and an SNS account are provided, and is combined with a communication function that is original to an SNS. A feature of a social game is that the game itself can be readily played in a short period of time.

As a social game, the present embodiment adopts a game which is connected via the communications line NT to the terminal device 12 manipulated by a game player and which causes assemblies consisting of a plurality of units set in a game space to engage in battle with each other.

In this case, a group owned by the game player is adopted as the assembly described above. While a team of an organized sport such as baseball, soccer, or American football can be adopted as a group, an army constituted of feudal warlords will be adopted in the present embodiment. In addition, while a warlord card or a warlord character simulating a feudal warlord is adopted as a unit, a warlord card will be exemplified in the following description. A warlord card is not a card existing in real space and is a virtual card set inside a game space. Meanwhile, if a team of an organized sport is adopted as an assembly, a player card or a player character is to be adopted as a unit.

The game player increases an ability score of his/her own army by engaging in battle with an army owned by another game player and taking away an item or a warlord card belonging to the opposing army.

A card level value is individually set to a warlord card and determines a total ability score of an army to which the warlord card belongs. Warlord cards include a leader warlord card indicating a warlord that is a leader of an army, a normal warlord card (an example of a first virtual card) having a normal card level value, and a rare warlord card (an example of a second virtual card) having a card level value that is higher than that of a normal warlord card.

FIG. 2 is a block diagram showing a detailed configuration of the game operation device 11 shown in FIG. 1. As shown in FIG. 2, the game operation device 11 comprises a game player managing unit 21, a deposit managing unit 22, a frequency managing unit 23, a benefit offering unit 24, an army managing unit 25 (an example of an assembly managing unit), a game information storage unit 26, and a communicating unit 27. The game player managing unit 21 to the army managing unit 25 are constituted by a CPU or the like. The game information storage unit 26 is constituted by a storage device such as a hard disk. The communicating unit 27 is constituted by a communication circuit such as a modem. These blocks are realized as a CPU executes a game operation program according to an embodiment of the present invention.

The game player managing unit 21 enables a game player desiring to execute a social game operated by the present game operation device 11 to register as a member and manages information on game players having registered as members. Specifically, when a member registration request transmitted from the terminal device 12 is received by the communicating unit 27, the game player managing unit 21 stores information regarding a game player desiring to register as a member in a game player information database shown in FIG. 4.

FIG. 4 is a diagram showing data structures of databases stored in the game information storage unit 26 shown in FIG. 2. As shown in FIG. 4, the game information storage unit 26 stores a game player information database, an army information database, a history information database, a deposit information database, and a card database (not shown).

The game player information database is a relational database in which one record is allocated to each game player and comprises the following fields: game player ID, game player name, registration date, and virtual currency.

A member registration request includes a game player name. For example, a nickname or a real name of a game player is adopted as the game player name. Therefore, when a member registration request is received, the game player managing unit 21 assigns a game player ID to the game player having transmitted the member registration request, generates a recording storing the game player ID, and adds the generated record to the game player information database. Subsequently, the game player name included in the member registration request is stored in the game player name field of the record of the game player. In addition, a date on which the game player had registered as a member is stored in the registration date field of the record of the game player.

The virtual currency field stores an amount of virtual currency in the possession of each game player. The virtual currency is pseudo-money that can only be used on the game operation device 11 and is a conversion of cash owned by the game player. For example, by paying 1,000 yen, the game player can obtain 1,000 yen's worth of virtual currency. In a case where the game operation device 11 provides a plurality of games, the game player can use the converted virtual currency in any of the games.

When the game player wishes to purchase virtual currency, the game player inputs a virtual currency purchase instruction to the terminal device 12. Subsequently, the terminal device 12 transmits a virtual currency purchase command to the game operation device 11. For example, the virtual currency purchase command includes a "game player ID", "credit card information", and a "virtual currency purchase amount".

Therefore, when a virtual currency purchase command is received by the communicating unit 27, the game player managing unit 21 performs an electronic settlement based on the credit card information and stores an amount in the virtual currency corresponding to the purchase amount in the game player information database.

For example, a card number of a credit card belonging to the game player is adopted as the credit card information. The game player managing unit 21 identifies a credit card company from the card number, makes an electronic settlement request to an electronic settlement server operated by the credit card company and, when the electronic settlement is approved, gives the game player permission to purchase virtual currency.

The history information database is a relational database in which one record is allocated to each game player and comprises the following fields: game player ID, game history, and frequency history.

When a game player logs into the game operation device 11 to execute the game, the game player managing unit 21 stores the year, the month, the day, and the time of the login to the game history field of the record of the corresponding game player in the history information database shown in FIG. 4. In addition, when the game player logs out from the game operation device 11 to end the game, the game player managing unit 21 stores the year, the month, the day, and the time of the logout to the game history field of the record of the corresponding game player in the history information database. A frequency at which the game player executes the game is stored in the frequency history field of the history information database. A description of frequency will be given later.

Returning to FIG. 2, the deposit managing unit 22 receives a game player's deposit command transmitted from the terminal device 12 and deposits virtual currency in a deposit amount specified by the game player according to the received deposit command. In addition, the deposit managing unit 22 prohibits the game player from using the virtual currency deposited by the game player until a predetermined deposit period expires. In other words, when the game player deposits virtual currency, the game player is unable to purchase items and the like using the virtual currency until the deposit period expires.

Specifically, when a deposit command is received by the communicating unit 27, the deposit managing unit 22 generates a record storing the game player ID of the game player having transmitted the deposit command, and adds the generated record to the deposit information database. Necessary information is then stored in the respective fields of the added record and the deposit information database shown in FIG. 4 is updated.

The deposit information database is a relational database in which one record is allocated to each game player and comprises the following fields: game player ID, deposit amount, and deposit period. The game player ID field stores a game player ID for identifying a game player. The deposit amount field stores a deposit amount of virtual currency deposited by the game player.

The deposit period field stores information for identifying a deposit period specified by the game player. In the example shown in FIG. 4, a deposit start date and a deposit end date are stored in the deposit period field. Therefore, the deposit period is a period from the deposit start date to the deposit end date.

The game player manipulates the terminal device 12 to input a deposit instruction for instructing a virtual currency deposit amount, a deposit period, and the like. Subsequently, the terminal device 12 generates a deposit command containing contents of the deposit instruction and transmits the deposit command to the game operation device 11. The deposit command includes information indicating a game player ID, a deposit amount, and a deposit period.

Therefore, when a deposit command is received by the communicating unit 27, the deposit managing unit 22 judges whether or not the deposit amount included in the deposit command is equal to or lower than an amount of virtual currency owned by the game player by referring to the game player information database. When it is judged that the deposit amount instructed by the game player is equal to or lower than the amount of virtual currency, a record storing the game player ID included in the deposit command is generated and the generated record is added to the deposit information database. Subsequently, the deposit amount included in the deposit command is stored in the deposit amount field of the added record. In addition, the deposit amount is subtracted from the amount of virtual currency of the corresponding game player in the game player information database and the game player information database is updated.

Furthermore, the date on which the deposit command had been accepted is stored as a deposit start date in the deposit period field of the added record. In addition, a date obtained by adding the deposit period included in the deposit command to the deposit start date is stored as a deposit end date in the deposit period field of the added record. In this manner, a game player can deposit virtual currency. Hereinafter, a game player having deposited virtual currency will be referred to as a "depositing game player".

Moreover, upon arrival of a deposit end date, the deposit managing unit 22 deletes a corresponding record from the deposit information database.

In addition, when a refund command for refunding deposited virtual currency is received by the communicating unit 27 from the terminal device 12 of a depositing game player before the deposit period expires, the deposit managing unit 22 reduces the deposit amount and refunds the virtual currency to the depositing game player.

Figure 17:
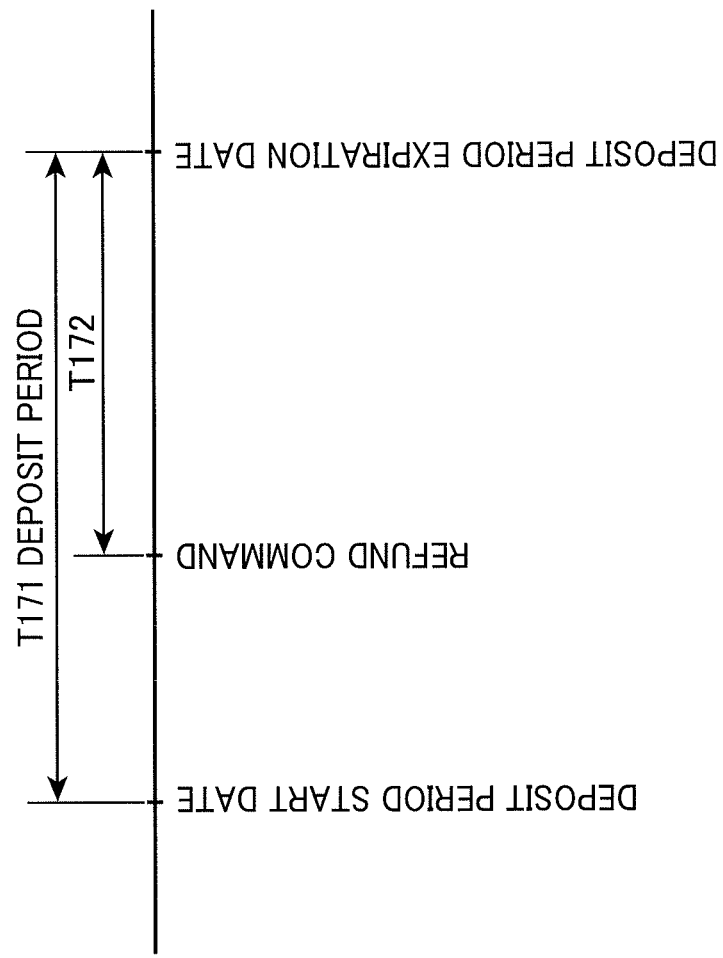
FIG. 17 is an explanatory diagram of processing by a deposit managing unit when a refund command is received.

FIG. 17 is an explanatory diagram of processing by the deposit managing unit 22 when a refund command is received. The deposit managing unit 22 refunds the virtual currency to the game player by increasing a reduced amount from the deposit amount as a period T172 from the time of reception of the refund command to the deposit end date extends.

For example, if a deposit amount is denoted by Xo and a deposit period by T171, then a reduced amount Xd is calculated as Xd=(T172/T171)·Xo. Therefore, a refund amount Xr to be refunded to the depositing game player is expressed as Xr=Xo−Xd.

As shown, since the refund amount Xr is reduced from the deposit amount Xo when a depositing game player closes out his/her deposit before the deposit period T171 expires, a depositing game player can be motivated not to close out his/her deposit before the deposit period T171 expires.

For example, cases where a depositing game player may attempt to close out his/her deposit includes a case where the depositing game player comes across an item that he/she strongly wishes to purchase using virtual currency. In this case, if the depositing game player is allowed to close out his/her deposit to purchase virtual currency using the refunded virtual currency, the whole significance of providing a deposit is lost. On the other hand, by imposing a penalty on a depositing game player of reducing the deposit amount if the deposit is withdrawn, the depositing game player does not withdraw his/her deposit but separately converts cash into virtual currency instead, and attempts to purchase an item using the virtual currency. As a result, revenue of the game operating company can be increased.

In addition, by increasingly reducing the refund amount Xr as the period T172 extends, if the deposit end date is near, a depositing game player can be presented with the options of purchasing an item by withdrawing his/her deposit even if doing so results in a slight loss or purchasing the item by separately converting cash into virtual currency. Therefore, the appeal of the game can be enhanced. Furthermore, even when a depositing game player comes across an item that he/she strongly wishes to purchase, since the refund amount Xr is to be refunded in full by waiting a little longer to withdraw his/her deposit, an option of waiting a little longer to withdraw his/her deposit can be presented to the depositing game player. Therefore, a greater variation in decision making can be presented to the game player.

Moreover, when a refund command is received by the communicating unit 27, the deposit managing unit 22 may delete the record of the depositing game player having transmitted the refund command from the deposit information database shown in FIG. 4.

In addition, when a deposit update command for increasing a deposit amount is received by the communicating unit 27 from the terminal device 12 of a depositing game player during a deposit period, the deposit managing unit 22 adds an increased amount specified in the deposit update command to the current deposit amount without reducing the current deposit amount, sets the sum as the updated deposit amount, and starts counting a deposit period as of the time of reception of the deposit update command.

Figure 18B:
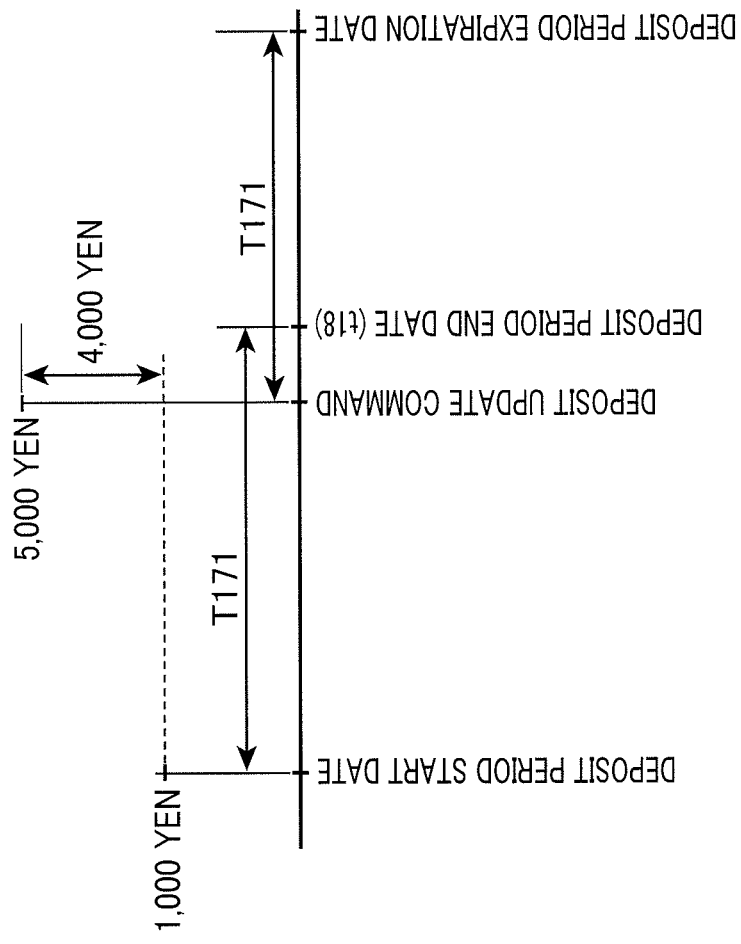
FIG. 18B is a diagram showing an advantage that is gained when the deposit update command is adopted.
Figure 18A:
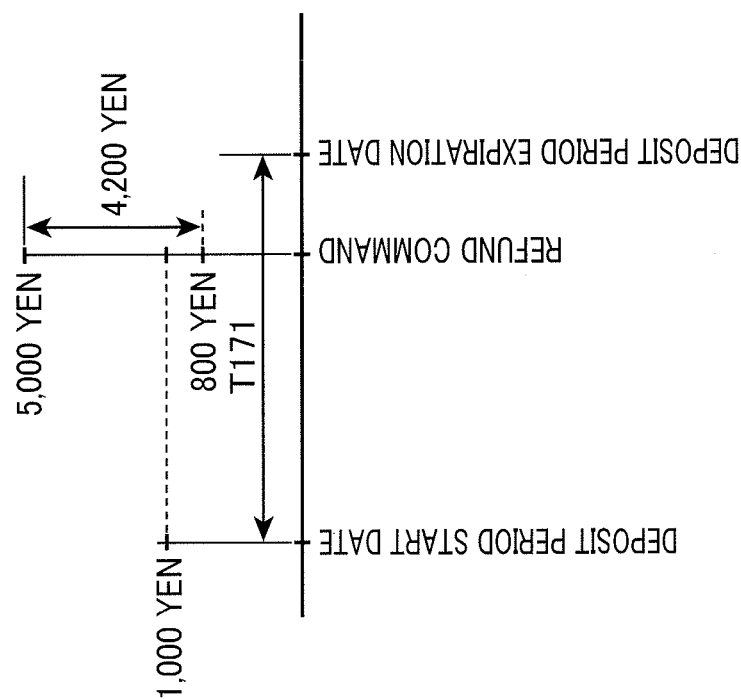
FIG. 18A is a diagram showing a problem that occurs when the deposit update command is not adopted.

FIG. 18 are explanatory diagrams of processing by the deposit managing unit 22 when a deposit update command is received, wherein FIG. 18A is a diagram showing a problem that occurs when the deposit update command is not adopted, and FIG. 18B is a diagram showing an advantage that is gained when the deposit update command is adopted.

A depositing game player may desire to increase his/her deposit amount during the deposit period T171. For example, there may be a case where a depositing game player wishes to increase a current deposit amount of 1,000 yen to 5,000 yen. As will be described later, the reason for this is because a benefit offered to a depositing game player increases in proportion to the deposit amount.

In this case, simply raising the deposit amount to 5,000 yen by adding 4,000 yen to the current deposit amount of 1,000 yen does not provide an apparent difference from a benefit offered to a depositing game player who had deposited 5,000 yen to begin with and therefore provides very little appeal.

On the other hand, a configuration in which the deposit is first withdrawn and 5,000 yen is then deposited anew causes the depositing game player a loss since the present embodiment adopts a configuration in which a refund amount is reduced from the original deposit amount if the deposit is withdrawn before the deposit period expires as described above.

For example, as shown in FIG. 18A, let us assume that a depositing game player having deposited 1,000 yen transmits a refund command and a refund amount in a case of withdrawing his/her deposit is 800 yen. In this case, if the depositing game player wishes to deposit 5,000 yen, the depositing game player must add 4,200 yen to 800 yen and ends up taking a loss of 200 yen.

In consideration thereof, as shown in FIG. 18B, by transmitting a deposit update command, the depositing game player is able to deposit 5,000 yen by simply adding 4,000 yen to 1,000 yen that is the deposit amount. Accordingly, the depositing game player can increase the deposit amount without taking a loss even during the deposit period.

In this case, allowing the deposit period T171 to expire at an original deposit end date t18 after the deposit update command is transmitted results in reducing a period over which the depositing game player is eligible for a benefit worth 5,000 yen. In consideration thereof, by setting the date on which the deposit update command had been transmitted as a start date of the deposit period T171 and recounting the deposit period 171, the period over which the depositing game player is eligible for a benefit worth 5,000 yen can be extended. As a result, the depositing game player can be motivated to transmit a deposit update command to increase his/her deposit amount.

Moreover, when a deposit update command is received by the communicating unit 27, the deposit managing unit 22 writes an updated deposit amount into the deposit amount field and, at the same time, writes in an updated deposit start date and an updated deposit end date into the deposit start date field and the deposit end date field of the deposit information database shown in FIG. 4.

Returning now to FIG. 2, the frequency managing unit 23 manages a frequency at which a depositing game player executes the game. For example, the frequency managing unit 23 refers to the history information database every predetermined period of time (for example, every day) and calculates a frequency of each depositing game player. Specifically, when a predetermined frequency calculation time (for example, 0:00 a.m.) arrives, the frequency managing unit 23 obtains the number of game executions by each depositing game player for a certain past period of time from the frequency calculation time. In this case, a period of time such as a past month or a past week as of the frequency calculation time may be adopted as the certain past period of time $T_p$. In addition, the number of game executions $C_p$ during the certain past period of time $T_p$ is identified from the game history field of the history information database. For example, the number of game executions $C_p$ may be identified by a login time during the certain past period of time $T_p$ which is written in the game history field or by counting the number of login times.

Subsequently, a frequency $H_p$ (=$C_p/D_p$) may be obtained by dividing the identified number of game executions $C_p$ by the number of days $D_p$ in the certain past period of time $T_p$. In other words, the frequency $H_p$ is expressed as the number of game executions $C_p$ per day during the certain past period of time $T_p$. For example, assuming that the certain past period of time $T_p$ is one week and a depositing game player has executed the game once every day, since the number of game executions $C_p$ is 7 and the number of days $D_p$ is 7, the frequency $H_p$ can be calculated as $H_p=1.0$ (=7/7). Moreover, if the depositing game player has executed the game twice every day and the number of game executions $C_p$ is 14, then the frequency $H_p$ can be calculated as $H_p=2.0$ (=14/7).

In addition, the frequency managing unit 23 writes the frequency $H_p$ calculated for each depositing game player into the frequency history field of the history information database in association with the frequency calculation time. Accordingly, the frequency $H_p$ of each depositing game player is written into the frequency history field once every day.

Moreover, until a first certain period of time $T_p$ lapses after a depositing game player starts a deposit, the frequency $H_p$ may be obtained by dividing the number of game executions by the number of days from the start of deposit.

Returning now to FIG. 2, when the depositing game player deposits virtual currency, the benefit offering unit 24 offers the depositing game player a benefit that gives a higher advantage to the depositing game player in battle until the deposit period expires compared to a case where the depositing game player does not deposit virtual currency.

Specifically, until the deposit period expires, the benefit offering unit 24 executes a lottery process for the depositing game player for determining which virtual card between a normal warlord card and a rare warlord card is to be offered to the depositing game player based on an access to the game operation device 11.

Upon performing the lottery process, when the game player has deposited virtual currency, the benefit offering unit 24 sets a benefit offering probability that indicates a probability of winning a rare warlord card higher than in a case where the game player has not deposited virtual currency.

In the present embodiment, while the benefit offering probability is set to, for example, 1/10 for a depositing game player, the benefit offering probability is set to, for example, 1/10000 for a normal game player who has not deposited virtual currency. In this manner, the benefit offering probability for a depositing game player is set to a value that is around 1000 times higher than the benefit offering probability for a normal game player. However, this is merely an example and any value may be adopted as long as the benefit offering probability for a depositing game player is higher than that for a normal game player.

While a lottery process is also executed for normal game players based on an access to the game operation device 11, the lottery process is not executed if an energy value (to be described later) has not reached a certain value. In this case, since the benefit offering probability of winning a rare warlord card is set to 1/10000 as described above, it is extremely difficult for a normal game player to win a rare warlord card.

In addition, the benefit offering unit 24 lowers the benefit offering probability as the frequency calculated by the frequency managing unit 23 decreases. Specifically, the benefit offering unit 24 identifies a frequency factor $\alpha 1$ determined in advance according to frequency, multiplies the identified frequency factor $\alpha 1$ by a benefit offering probability $P_g$ set for depositing game players, and obtains a benefit offering probability $P_g'$ in order to lower the benefit offering probability $P_g$.

Figure 16B:
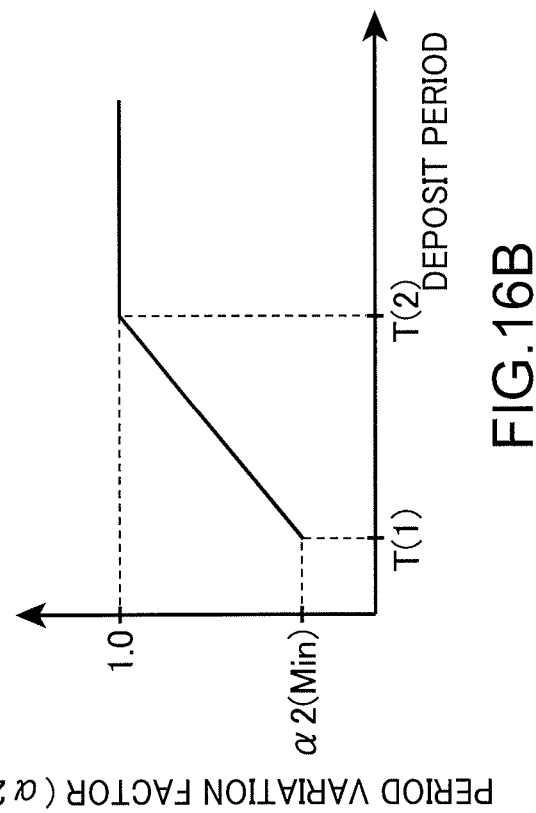
FIG. 16B is a graph showing a relationship between a period variation factor and deposit period.
Figure 16A:
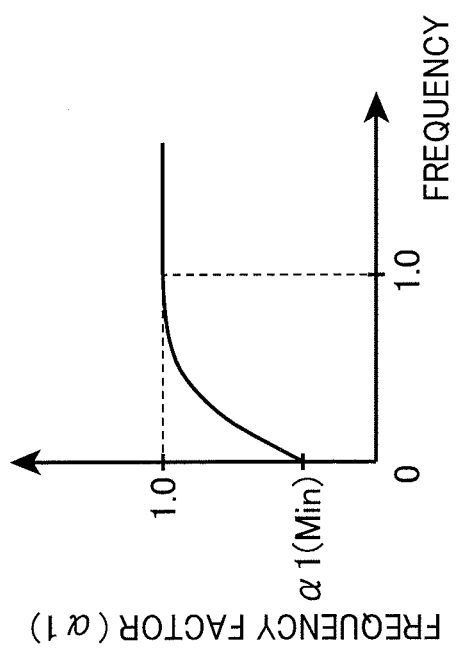
FIG. 16A is a graph showing a relationship between a frequency factor and frequency.

FIG. 16A is a graph showing a relationship between the frequency factor $\alpha 1$ and frequency, wherein an ordinate represents the frequency factor $\alpha 1$ and an abscissa represents frequency. In the case of this graph, the frequency factor $\alpha 1$ is set to a minimum value $\alpha 1(Min)$ when the frequency is 0. In this case, a value that causes the benefit offering probability $P_g'$ to be higher than the benefit offering probability $P_g$ for normal game players is adopted as the minimum value $\alpha 1(Min)$. For example, if it is assumed that the benefit offering probability $P_g$ for depositing game players is 1/10 and the benefit offering probability $P_g$ for normal game players is 1/10000, then a value that is equal to or higher than 1/1000 is adopted as the minimum value $\alpha 1(Min)$.

Accordingly, the benefit offering probability $P_g'$ for depositing game players can be prevented from falling below the benefit offering probability $P_g$ for normal game players, and a depositing game player can be prevented from suffering a greater loss than a normal game player.

In addition, in the case of this graph, the frequency factor $\alpha 1$ is set to 1.0 when the frequency is 1.0. Accordingly, as long as the frequency of a depositing game player is 1.0 or higher, the depositing game player has a frequency factor $\alpha 1$ of 1.0 and the benefit offering probability $P_g$ is not lowered. Therefore, as long as the depositing game player executes the game once every day, the frequency factor $\alpha 1$ is set to 1.0 and the benefit offering probability $P_g$ is not lowered.

As described above, since the benefit offering probability does not decrease if a depositing game player executes the game every day, the depositing game player is motivated to execute the game every day and the number of accesses to the game can be increased.

Furthermore, in the case of this graph, the frequency factor $\alpha 1$ is set such that the frequency factor $\alpha 1$ does not significantly decrease from 1.0 even if the frequency drops below 1.0 but sharply decreases toward the minimum value $\alpha 1(\text{Min})$ when the frequency decreases by a certain amount from 1.0 (for example, to around 0.5).

In addition, since the frequency factor $\alpha 1$ is identified using the graph shown in FIG. 16A and the benefit offering probability Pg' is obtained using the identified frequency factor $\alpha 1$, when the frequency Hp shifts to increase, the benefit offering probability Pg' having been reduced in accordance with the decrease of the frequency Hp can be increased.

Accordingly, even when a depositing game player had not played the game for a while and the benefit offering probability Pg' has been lowered, the benefit offering probability Pg' can be restored by increasing the number of game executions. As a result, a depositing game player can be motivated to increase the number of game executions and can be prevented from staying away from the game.

Furthermore, in the present embodiment, a game player can purchase a lottery process request item for requesting an execution of the lottery process described above using virtual currency regardless of the game player being a depositing game player or a normal game player.

In this case, when a manipulation instruction for using the lottery process request item is inputted by a game player and a lottery process request item use command transmitted from the terminal device 12 of the game player is received by the communicating unit 27, the benefit offering unit 24 may set the benefit offering probability Pg to a higher value than the maximum value of the benefit offering probability Pg set for depositing game players and execute a lottery process for offering either a normal warlord card or a rare warlord card according to the set benefit offering probability Pg.

The deposit managing unit 22 may reduce the deposit amount of a depositing game player as the frequency of the depositing game player as calculated by the frequency managing unit 23 decreases. In this case, in a similar manner to the benefit offering unit 24, the deposit managing unit 22 may identify a frequency factor $\alpha 1$ in accordance with the frequency using the graph shown in FIG. 16A, and reduce the deposit amount by multiplying the deposit amount by the frequency factor $\alpha 1$.

In this case, 0 may be adopted as the minimum value $\alpha 1(\text{Min})$ of the frequency factor $\alpha 1$. By adopting 0 as the minimum value $\alpha 1(\text{Min})$, when the game frequency Hp of the depositing game player drops to 0, the frequency factor $\alpha 1$ becomes $\alpha 1=0$ and the benefit offering probability Pg' becomes Pg'=0. Accordingly, since the deposit amount of the deposited virtual currency drops to 0 when the number of game executions of the depositing game player decreases, the depositing game player can be motivated to avoid reducing the number of game executions and the number of accesses to the game can be increased.

In addition, even if a depositing game player allows his/her deposit amount to be reduced due to a decrease in frequency Hp, the depositing game player can once again restore the deposit amount to its original value by increasing the number of game executions and therefore increasing the frequency Hp. Accordingly, a depositing game player can be motivated to increase the number of game executions in order to restore his/her deposit amount to its original value and the number of accesses to the game can be increased.

In addition, the benefit offering unit 24 increases a benefit offered to a depositing game player as his/her deposit amount increases. Specifically, the benefit offering unit 24 increases the benefit offering probability Pg as the deposit amount increases.

Figure 19:
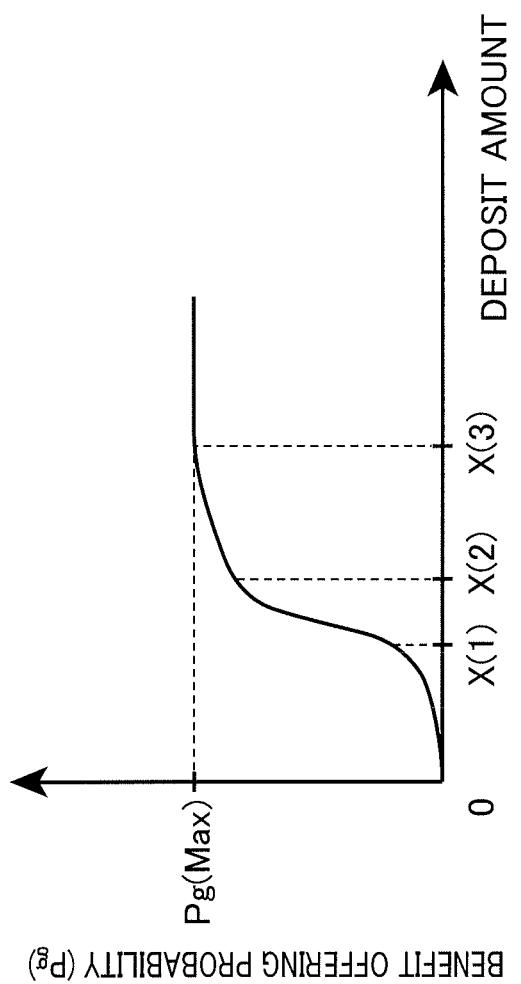
FIG. 19 is a graph showing a benefit offering probability set by a benefit offering unit.

FIG. 19 is a graph showing the benefit offering probability Pg set by the benefit offering unit 24, wherein an ordinate represents the benefit offering probability Pg and an abscissa represents deposit amount. FIG. 19 shows that the benefit offering probability Pg increases gradually until the deposit amount reaches a certain value X(1), increases sharply once the deposit amount exceeds X(1) and up to a value X(2), and increases gradually once the deposit amount exceeds X(2) and up to a value X(3). In addition, it is shown that once the deposit amount increases to value X(3), the benefit offering probability Pg reaches a maximum value Pg(Max), and subsequently maintains the maximum value Pg(Max) even if the deposit amount increases.

If the benefit offering probability Pg is set high even though the deposit amount is low or if the benefit offering probability Pg is set to a constant value regardless of the deposit amount, all depositing game players would only deposit small amounts. Therefore, by setting a high benefit offering probability Pg in accordance with the deposit amount, a depositing game player can be motivated to deposit even larger amounts.

On the other hand, as described above, a game player can also perform a lottery process by purchasing a lottery process request item using virtual currency and by using the lottery process request item.

In addition, if the benefit offering probability Pg based on the use of the lottery process request item is set lower than the benefit offering probability Pg that is set for depositing game players, a depositing game player may no longer go out of his/her way to purchase a lottery process request item because the probability of winning a rare warlord card is higher when performing a lottery process that is performed each time the game is executed.

In consideration thereof, the maximum value Pg(Max) of the benefit offering probability Pg shown in FIG. 19 is set to a value that is lower than the benefit offering probability Pg based on the use of a lottery process request item. Accordingly, a decline in a buying motivation of depositing game players towards lottery process request items can be prevented. Moreover, a value that is more or less equal to a purchase amount of a lottery process request item may be adopted as the value X(3) of a deposit amount that corresponds to the maximum value Pg(Max). Accordingly, a balance between a lottery process based on the use of a lottery process request item and a lottery process based on deposit can be maintained.

In the present embodiment, for example, since 1/10 is adopted as the maximum value Pg(Max), the benefit offering probability Pg based on the use of a lottery process request item is set to a value higher than 1/10 (for example, 1/2, 1/3, or 1/4).

If the relationship between the benefit offering probability Pg and deposit amount is set to a linear relationship, a game player can easily predict what kind of value the benefit offering probability Pg is to be set by depositing what kind of amount and results in a loss of enjoyment.

In consideration thereof, as shown in FIG. 19, sharply reducing the benefit offering probability Pg once the deposit amount equals or falls under value X(2) can prevent game players from readily working out the relationship between deposit amount and the benefit offering probability Pg and, at the same time, can motivate game players to make a deposit of a certain amount. In other words, a game player can be provided with the fun of guessing the benefit offering probability Pg according to deposit amounts such as to what kind of value the benefit offering probability Pg may be set by setting the deposit amount to what kind of amount.

Moreover, while a configuration in which the maximum value Pg(Max) is reached when the deposit amount reaches the value X(3) is adopted in FIG. 19, this configuration is not restrictive and a configuration may alternatively be adopted in which the maximum value Pg(Max) forms an asymptotic line and the larger the deposit amount, the benefit offering probability Pg infinitely approaches the maximum value Pg(Max). Accordingly, a case can be avoided where the benefit offering probability Pg plateaus and no longer increases even when the deposit amount is increased.

In addition, the benefit offering unit 24 increases a benefit offered to a depositing game player as the deposit period extends. Specifically, the benefit offering unit 24 increases the benefit offering probability Pg as the deposit period extends. More specifically, as shown in FIG. 16B, the benefit offering unit 24 may identify a period variation factor α2 determined in advance in accordance with the deposit period, and multiply the benefit offering probability Pg by the identified period variation factor α2 to correct the benefit offering probability Pg in order to calculate a benefit offering probability Pg'.

FIG. 16B is a graph showing a relationship between the period variation factor α2 and deposit period, wherein an ordinate represents the period variation factor α2 and an abscissa represents deposit period. Value T(1) shown on the abscissa represents a deposit period minimum value that can be set by a game player. In addition, value T(2) shown on the abscissa represents a deposit period maximum value that can be set by a game player.

For example, if it is assumed that the benefit offering probability Pg for depositing game players is 1/10 and the benefit offering probability Pg for normal game players is 1/10000, then a value that is equal to or higher than 1/1000 is adopted as a minimum value α2(Min) of the period variation factor α2 represented by the ordinate. Moreover, when the benefit offering probability Pg' calculated by multiplying the benefit offering probability Pg by the frequency factor α1 described earlier and by the period variation factor α2 is smaller than the benefit offering probability Pg (1/10000) for normal game players, the benefit offering probability Pg (1/10000) for normal game players may be set as the benefit offering probability Pg'.

Accordingly, the benefit offering probability Pg' for depositing game players can be prevented from falling below the benefit offering probability Pg for normal game players, and a depositing game player can be prevented from suffering a greater loss than a normal game player.

In addition, in the example shown in FIG. 16B, the period variation factor α2 gradually increases as the deposit period extends, and when the deposit period is set to value T(2), the period variation factor α2 is set to 1.0.

As a result, by extending the deposit period, the benefit offering probability Pg is increased accordingly and a depositing game player can be motivated to set a longer deposit period.

Returning to FIG. 2, the army managing unit 25 causes armies to engage in battle with each other in a game space, determines an outcome of the battle between the armies by comparing ability scores of the armies, and reduces the ability score of the losing army based on the determined outcome.

Specifically, when a battle request which specifies an army to become an opponent (hereinafter, referred to as an "enemy army") and an item that a game player desires to be transferred and which requests that the enemy army and the game player's own army (hereinafter, referred to as an "own army") engage each other in battle is transmitted from the terminal device 12 of the game player and the battle request is received by the communicating unit 27, the army managing unit 25 refers to the army information database shown in FIG. 4 and compares an energy value of the enemy army and an energy value of the own army. The army managing unit 25 then judges that the army with the higher energy value has won the battle, and transfers an item which is owned by the losing army and which had been specified by the game player to the winning army.

The army information database shown in FIG. 4 is a relational database in which one record is allocated to each army and comprises the following fields: army ID, army name, game player ID, ability score, items, cards, and battle history.

The army ID field stores an army ID that is identification information for identifying an army. The army name field stores a name attached to the army. The game player ID field stores a game player ID of the game player owning the army. Accordingly, a game player and an army owned by the game player are linked with each other. The ability score field stores a current ability score of the army.

An ability score includes a level value and an energy value. A level value is a numerical value that indicates a degree of ability of a leader warlord card and increases when an army wins a battle or by experiencing an event that is referred to as a quest. In addition, a level value defines the number of warlord cards owned by an army. In the present embodiment, an army can possess warlord cards until a total value of card basic values of warlord cards in the army's possession equals or falls below a value set according to the level value.

An energy value decreases every time an army engages in battle with another army and is restored when the game player is not executing the game. In the present embodiment, for example, a total value of card energy values of the respective warlord cards in the possession of an army is adopted as the energy value. Moreover, each warlord card can possess an energy value having a value set in advance according to a card level value as a maximum value thereof.

The items field stores items in the possession of the army. In this case, items include a card exchange item which can be exchanged for a normal warlord card or a rare warlord card by collecting a predetermined number thereof, a restorative item for restoring an energy value, a money item which virtually represents an amount of money possessed by the army, and the like. An example of a card exchange item is a crystal item. By collecting a predetermined number of (for example, six) crystal items, a game player is able to obtain a normal warlord card or a rare warlord card determined in advance according to the number of crystal items. A card exchange item is given by defeating an army possessing the card exchange item in battle, experiencing a quest for obtaining the card exchange item a certain number of times, or purchasing the card exchange item using virtual currency.

In addition, by using a restorative item, a game player can restore an energy value of an army by a value determined according to the type of restorative item. Moreover, a restorative item can be obtained by experiencing a quest for obtaining the restorative item a certain number of times or by purchasing virtual currency.

A money item cannot be obtained by converting real money as is the case of virtual currency. A money item is a virtual representation of the money possessed by an army and is an amount that is valid only in this game. In addition, for example, a money item is used to increase a level value or to restore an energy value. Moreover, when the army managing unit 25 causes armies to engage each other in battle, the army managing unit 25 causes the losing army to transfer a part of its money items to the winning army.

The cards field stores a card ID for identifying a warlord card possessed by an army, a card level value of each warlord card, and a card energy value of each warlord card. A card level value defines a maximum value of a card energy value. In other words, the higher the card level value, the greater the increase of the maximum value of the card energy value and the greater the increase of the energy value of an army. In addition, the card level value is increased according to the number of experienced quests and the number of victories in battle. Therefore, the card energy value also increases as the card level value increases.

The battle history field stores the year, the month, the day, and the time where the army had engaged in battle with an enemy army in association with an army ID of the enemy army.

In the card database, one record is allocated to each virtual card and the card database comprises the following fields: card ID, type, card level value, and card basic value. The type field stores information indicating a type of a warlord card and, in the present embodiment, stores information indicating whether a warlord card is a normal warlord card or a rare warlord card. The card level value field stores an initial card level value that a warlord card individually possesses. The card basic value field stores a card basic value for defining how many warlord cards a game player can have.

Returning to FIG. 2, the army managing unit 25 refers to the army information database and compares the energy values of both armies, and causes the army with the higher energy value to win.

In addition, when the own army challenges the enemy army to battle with a goal of capturing a crystal item and then wins the battle, the army managing unit 25 writes a crystal item captured from the enemy army into the item field of the own army and, at the same time, deletes the captured crystal item from the item field of the enemy army. Accordingly, the own army can capture a crystal item from the enemy army.

Furthermore, the army managing unit 25 may reduce the energy values of both armies as a result of the battle. In this case, the army managing unit 25 may set a reduction of the energy value of the winning army lower than a reduction of the energy value of the losing army. Accordingly, a greater advantage can be given to winning a battle and the feeling of tension that accompanies a battle can be enhanced.

In addition, the army managing unit 25 may individually obtain a reduction for each warlord card possessed by both armies and reduce the energy value of each warlord card. In this case, the army managing unit 25 may obtain a total reduction of the energy values of the respective warlord cards, allocate the total reduction of the energy values to the respective warlord cards either uniformly or by weighting, and reduce the energy value of each warlord card.

Furthermore, when armies engage in battle with each other and a game player possessing the winning army is a depositing game player, the army managing unit 25 may multiply a value of a money item to be captured from the losing army by a predetermined amplification factor and transfer a money item corresponding to the obtained value to the winning army.

In this case, as the amplification factor, the benefit offering unit 24 sets 1.0 if the winning game player is a normal game player and sets a value greater than 1.0 (for example, 1.5 or 2.0) if the winning game player is a depositing game player. Accordingly, a benefit offered to a depositing game player becomes greater compared to a normal game player and a normal game player can be motivated to deposit virtual currency.

Moreover, in a similar manner to the benefit offering probability Pg, the benefit offering unit 24 may increase the amplification factor as a frequency of a depositing game player increases, as a deposit period of a depositing game player extends, and/or as a deposit amount of a depositing game player increases. In this case, a minimum value of the amplification factor for depositing game players may be set higher than the amplification factor for normal game players.

In addition, when a game player is not executing the game, the army managing unit 25 restores the energy value of the game player's army over time at a predetermined recovery rate. In this case, the benefit offering unit 24 sets a recovery rate for depositing game players higher than a recovery rate for normal game players. Accordingly, a benefit offered to a depositing game player similarly becomes greater compared to a normal game player and a normal game player can be motivated to deposit virtual currency.

In this case, in a similar manner to the benefit offering probability Pg, the benefit offering unit 24 may increase the recovery rate as a frequency of a depositing game player increases, as a deposit period of a depositing game player extends, and/or as a deposit amount of a depositing game player increases. In this case, a minimum value of the recovery rate for depositing game players may be set higher than the recovery rate for normal game players.

FIG. 3 is a block diagram of the terminal device 12 shown in FIG. 1. The terminal device 12 comprises a manipulation/display unit 31, a control unit 32, a storage unit 33, and a communicating unit 34. For example, the manipulation/display unit 31 is constituted by a touch screen display device, and accepts various manipulation instructions inputted from a user and displays various images related to the game. In the present embodiment, particularly, the manipulation/display unit 31 accepts instructions such as a virtual currency purchase instruction or a virtual currency deposit instruction, and displays various images related to the game according to data transmitted from the game operation device 11.

For example, the control unit 32 is constituted by a CPU and is responsible for overall control of the terminal device 12. For example, the storage unit 33 is constituted by a non-volatile storage device and stores in the terminal 12 a program for executing the game described above as well as image data and the like necessary for executing the game described above.

The communicating unit 34 is constituted by a communication circuit which transmits various data to a communications line NT and which receives various data flowing along the communications line NT. In the present embodiment, particularly, the communicating unit 34 transmits a deposit command, a refund command, a deposit update command, a lottery process request item use command, and the like to the game operation device 11.

FIG. 5 is a flow chart showing processing that takes place when the terminal device 12 logs into the game operation device 11 according to an embodiment of the present invention and engages in battle with an enemy army. First, when the terminal device 12 accepts a login instruction that is inputted by a game player (YES in S501), the terminal device 12 transmits a login command to the game operation device 11 (S502). On the other hand, when the terminal device 12 does not accept a login instruction (NO in S501), the terminal device 12 advances processing to S503.

Figure 9:
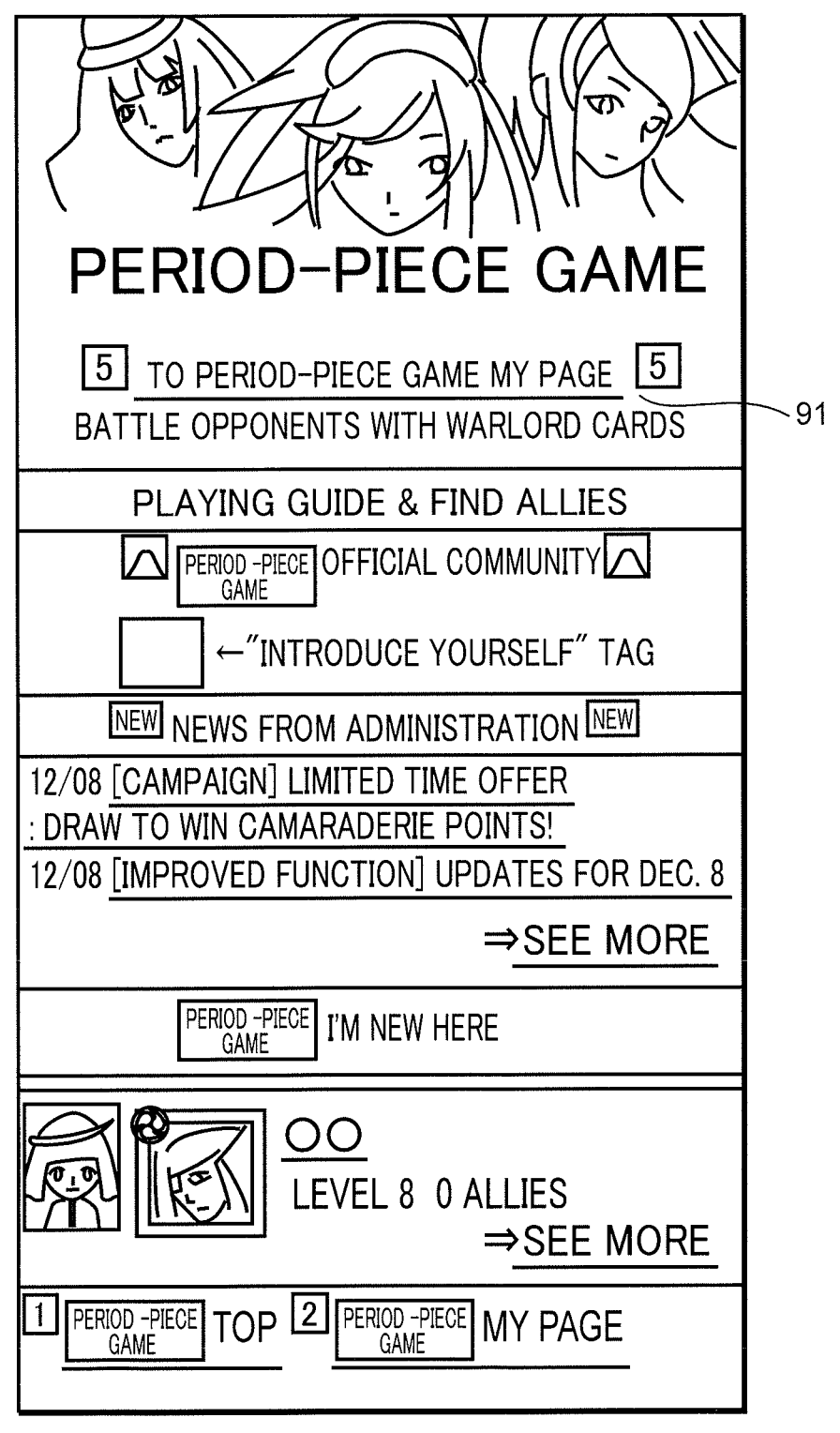

FIG. 9 is a screen view of a login screen that is displayed on the terminal device 12 in a game executed by the game operation device 11 according to an embodiment of the present invention. This login screen is downloaded as the game player manipulates the terminal device 12 and accesses the game operation device 11.

By inputting an input instruction to an item 91 that is accompanied by the description "To Period-piece Game My Page" displayed on the login screen into the terminal device 12, the game player inputs a login instruction. In addition, when an input instruction to the item 91 is made, a login command is transmitted to the game operation device 11.

On the login screen shown in FIG. 9, the item 91 is displayed because the game player has already registered as a member to the game operation device 11. On the other hand, if the game player has not yet registered as a member, by registering as a member on a top page of the game, a login screen on which the item 91 is displayed is subsequently displayed on the terminal device 12.

Returning to FIG. 5, when the game operation device 11 receives a login command transmitted from the terminal device 12 (YES in S521), the game operation device 11 writes the year, the month, the day, and the time of reception or transmission of the login command into the login field of the game history of the game player having transmitted the login command in the history information database shown in FIG. 4 (S522). Accordingly, the game history of the game player having transmitted the login command is updated. On the other hand, when the game operation device 11 does not receive a login command from the terminal device 12 (NO in S521), the game operation device 11 advances processing to S523.

Figure 10:
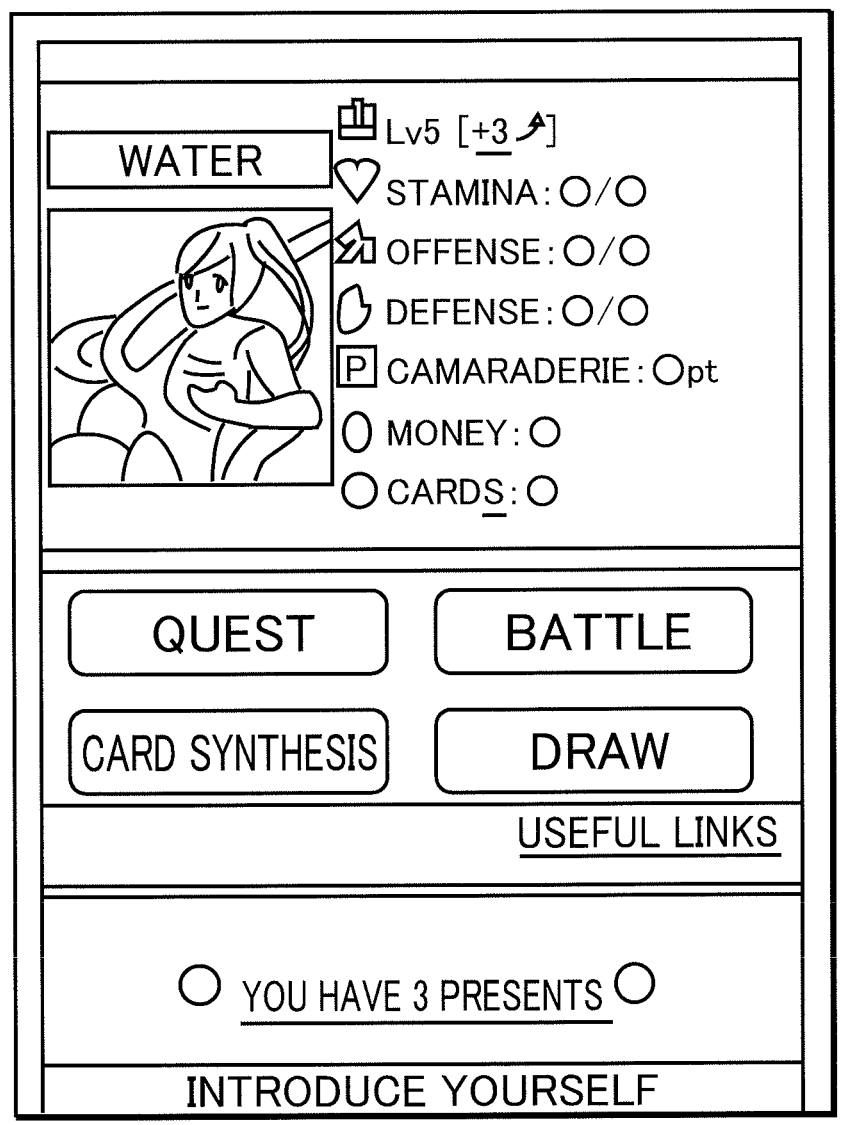
FIG. 10 is a diagram showing a My Page screen.

When the game player logs into the game operation device 11, a My Page screen is displayed on the terminal device 12 of the game player. FIG. 10 is a diagram showing a My Page screen.

An ability score of an army possessed by the game player is displayed on a right side of an upper part of the My Page screen. In this example, items "Lv5", "stamina", "offense", "defense", "camaraderie", "money", and "cards" are displayed as the ability score. "Lv5" indicates a level value of a leader warlord card. In this case, the army has a level value of level 5.

"Stamina", "offense", and "defense" are parameters indicating an ability score of the leader warlord card and are respectively expressed by fractions. A value of a denominator indicates a maximum value of an energy value that can be accumulated for each parameter and is a value in accordance with the level value of the army. A value of a numerator indicates a current energy value of each parameter of the leader warlord card.

"Money" indicates a value of money items possessed by the army. "Cards" indicate the number of warlord cards possessed by the army.

An attribute of the leader warlord card is displayed on a left side of the upper part of the My Page screen. In this case, the description "water" is shown. A thumbnail image that is an image representation of the leader warlord card is displayed under "water".

Buttons "quest", "battle", "card synthesis", and "draw" are displayed in two rows and two columns in a lower part of the My Page screen. When the game player selects "quest", a quest execution screen is downloaded from the game operation device and displayed on the terminal device 12. The quest execution screen displays contents that prompt the game player to perform simple button manipulations, and by performing button manipulations according to the contents, the game player can have his/her own army experience the quest.

In addition, when the number of quest experiences reaches a certain number, the level value of the army is increased by one point.

When the game player selects "battle", an opponent selection screen is downloaded from the game operation device 11 to the terminal device 12 and displayed on the terminal device 12. Armies of other game players which are opponent candidates are displayed as a list on the opponent selection screen. Subsequently, as the game player selects any one of the armies displayed as a list, a screen shown in FIG. 11 providing details of the army is displayed on the terminal device 12.

Figure 11B:
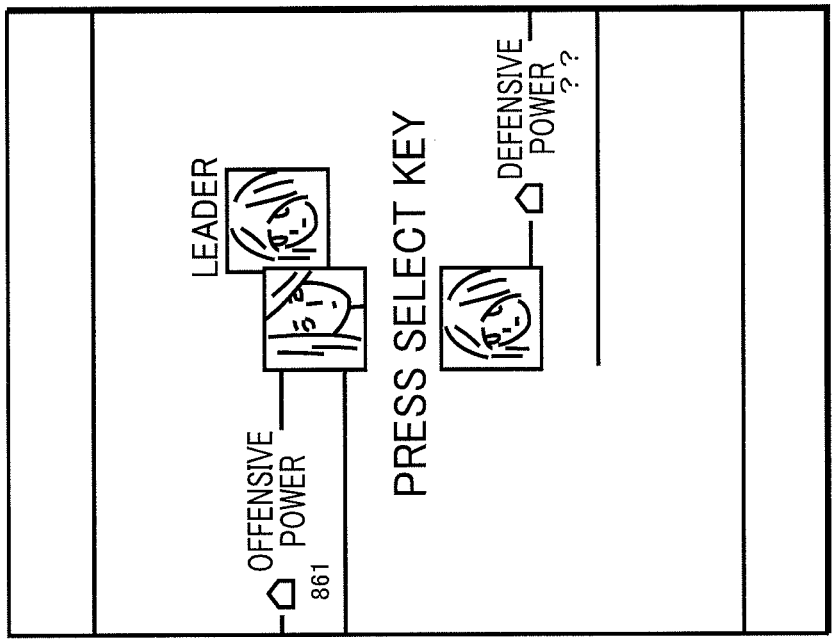
FIG. 11 are screen views showing details of an army that is an opponent candidate selected by a game player.
Figure 11A:
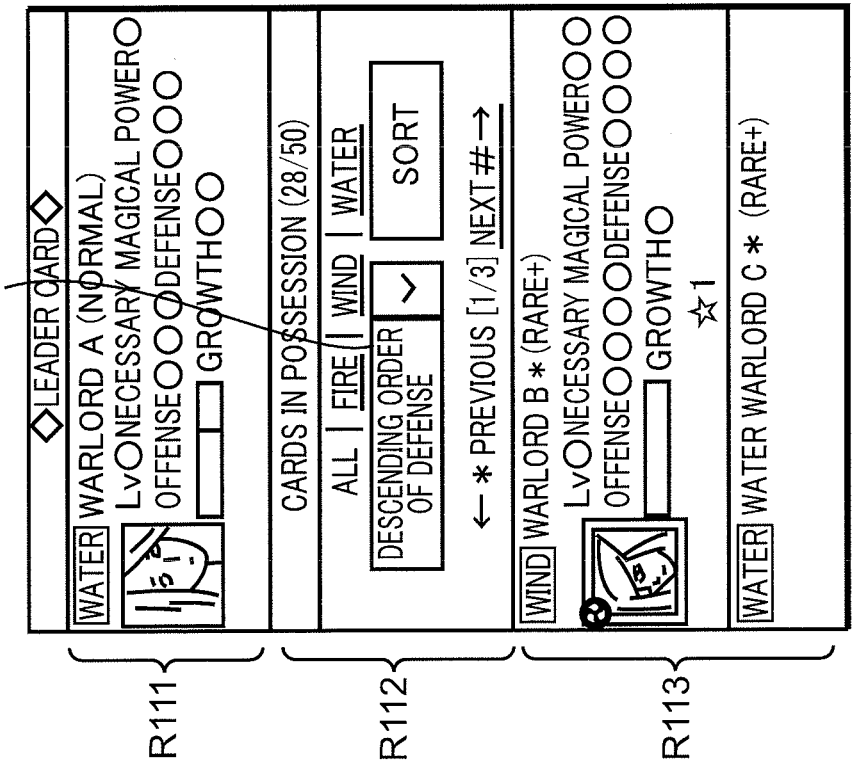

FIG. 11 are screen views showing details of an army that is an opponent candidate selected by the game player. An upper part R111 of the screen shown in FIG. 11 show an image of a leader warlord card of the army and parameters that define an ability score of the leader warlord card. In FIG. 11, "LvX", "necessary magical power X", "offense XXX", and "defense XXX" are displayed. "Lv" indicates a level value of the leader warlord card. "Necessary magical power", "offense", and "defense" are, respectively, parameters indicating the ability score of the leader warlord card and have values in accordance with the level value.

A middle part R112 displayed below the upper part R111 is an input field for displaying warlord cards possessed by the army to which the leader warlord card displayed in the upper part R111 belongs. An attribute such as "fire", "wind", or "water" is defined for warlord cards. For example, when the game player selects "fire" displayed in the middle part R112, a warlord card of a "warlord A" whose attribute is "fire" is displayed in a lower part R113.

In addition, a condition for defining a display order of warlord cards to be displayed in the lower part R113 is inputted to a conditional display field R1121 displayed in the middle part R112. Since the conditional display field R1121 displays conditions in a pulldown format, by selecting any one of the conditions and then selecting a "sort" button, the game player can have warlord cards displayed in an order in accordance with the selected condition.

Since "descending order of defense" is selected in the example shown in FIG. 11, warlord cards are displayed as a list in a descending order of "defense" parameters in the lower part R113. In the example shown in FIG. 11, a warlord card of a "warlord B" is displayed. Accordingly, the game player can acknowledge that the army that is an opponent candidate possesses the warlord card of the "warlord B".

A note that says "rare" is attached to the warlord card of the "warlord B" to indicate that the warlord card is a rare warlord card. An image, a name, an ability score, and the like of each warlord card are described in the lower part R113.

When the game player desires to engage the army to which the leader warlord card displayed in the upper part R111 belongs in battle and inputs a transition instruction to a battle start screen, a battle start screen shown in FIG. 11B is displayed on the terminal device 12. In addition, by selecting a "select" button (not shown) on the battle start screen, the game player inputs a battle instruction (YES in S503).

When a battle instruction is inputted by the game player, a battle command is transmitted from the terminal device 12 of the game player to the game operation device 11 (S504). On the other hand, when a battle instruction is not inputted by the game player (NO in S503), processing is advanced to S601 in FIG. 6.

When the game operation device 11 receives the battle command (YES in S523), the game operation device 11 makes a win-loss judgment (S524) and transmits the battle's outcome to the terminal device 12 (S525). In this case, the terminal device 12 displays a battle screen shown in FIG.

12A. FIG. 12A is a diagram showing a battle screen. Warlord cards possessed by the game player's army are displayed as a list on the battle screen. As described above, the game operation device 11 determines an outcome by comparing the energy values of the armies.

Figure 12B:
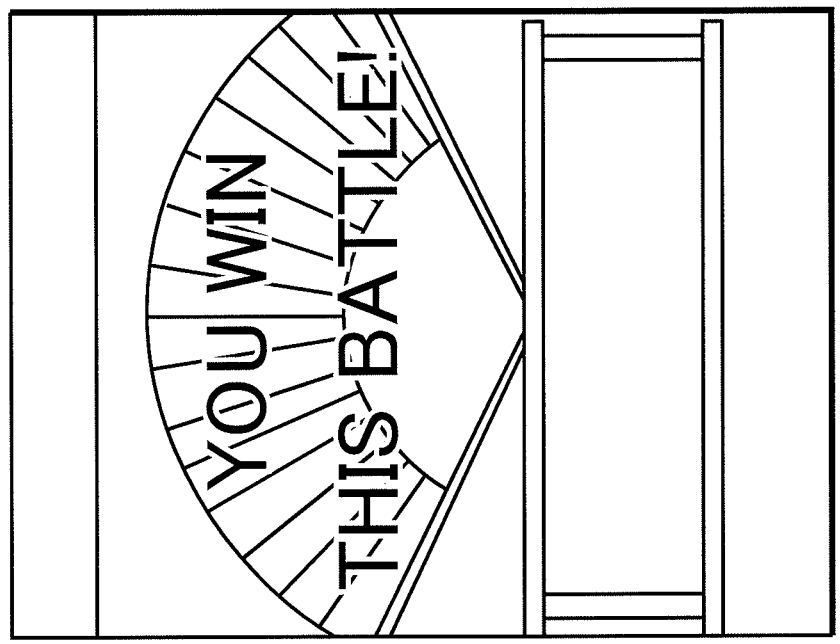
FIG. 12B is a diagram showing a victory notification screen that is displayed upon winning a battle.
Figure 12A:
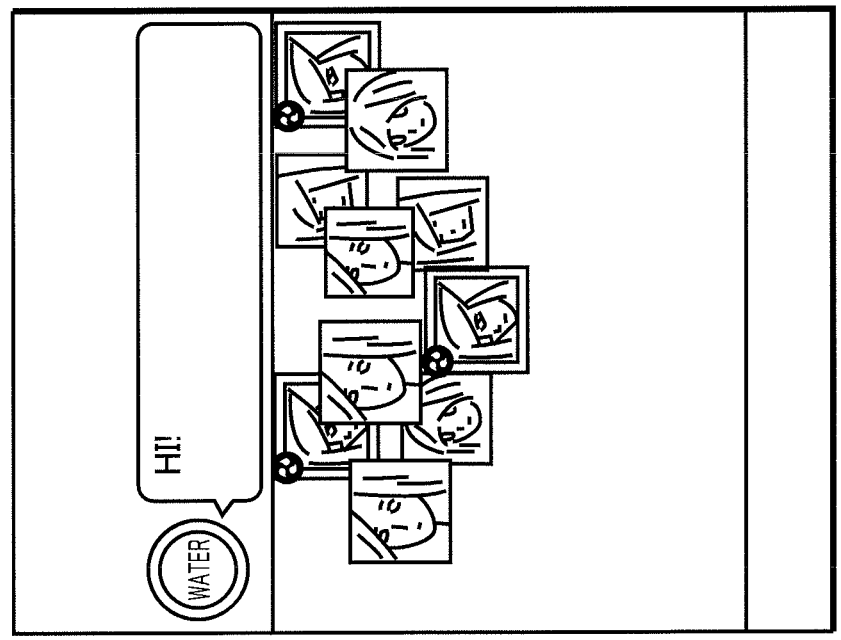
FIG. 12A is a diagram showing a battle screen.

When the game player wins the battle, the game operation device 11 transmits a victory notification screen shown in FIG. 12B to the terminal device 12. On the other hand, when the game player loses the battle, the game operation device 11 transmits a screen notifying that the game player has lost to the terminal device 12.

Figure 6:
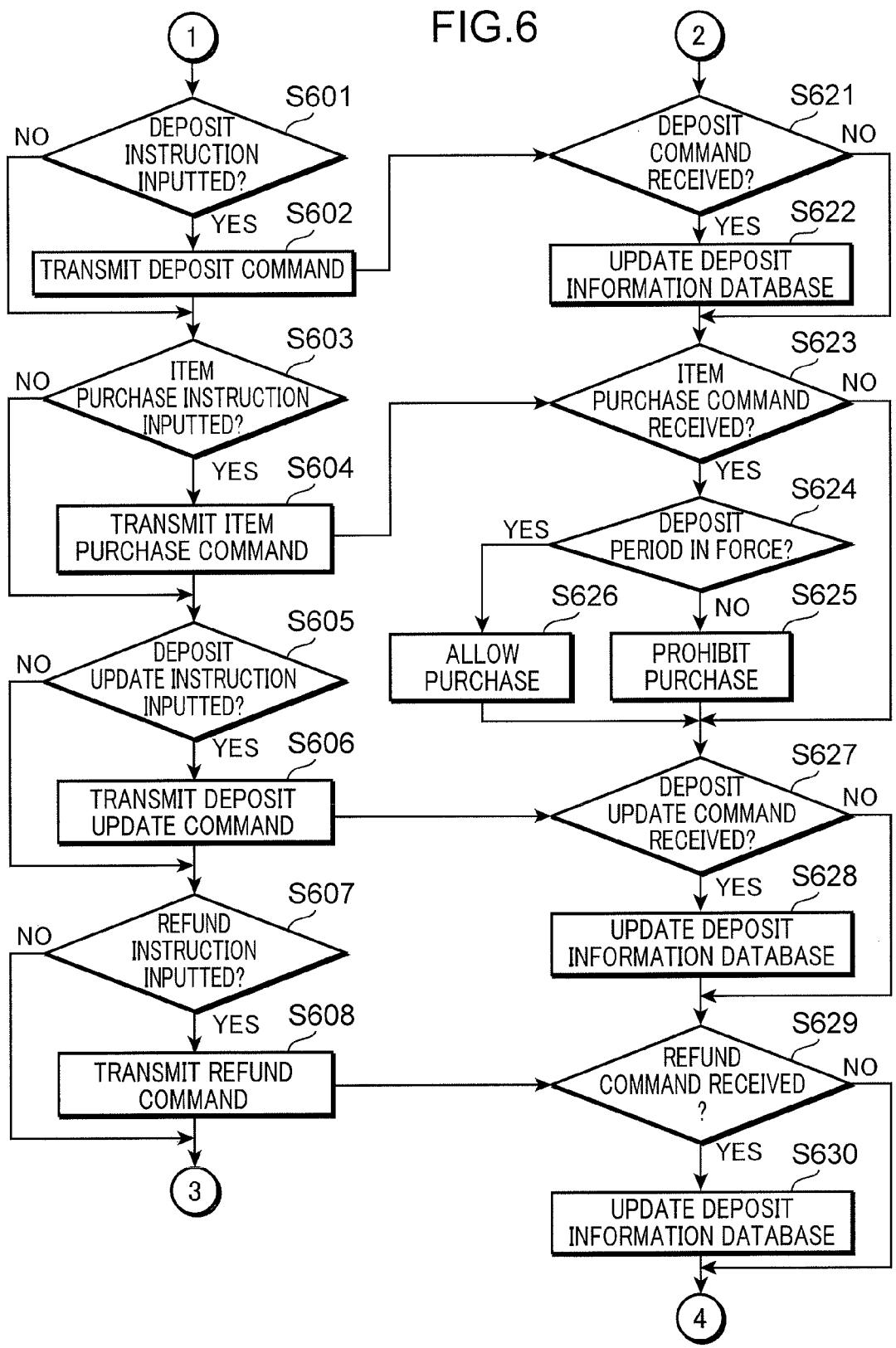
FIG. 6 is a flow chart showing processing that is performed by a terminal device and a game operation device when depositing virtual currency, when purchasing an item, when updating a deposit, and upon a refund.

Subsequently, according to the battle's outcome, the game operation device 11 updates the army information database shown in FIG. 4 (S526) and advances processing to S621 shown in FIG. 6. Specifically, the army managing unit 25 of the game operation device 11 obtains a reduction in a card energy value of each warlord card possessed by both armies having engaged in the battle, obtains a card energy value of each warlord card after the battle, and updates the card field with the obtained card energy value. In addition, the miff managing unit 25 updates the ability score field with a total value of the card energy values of the respective warlord cards after the battle. Furthermore, the army managing unit 25 deletes an item captured as a result of the battle from the item field and, at the same time, writes the item captured as a result of the battle into the item field. In addition, the army managing unit 25 writes the year, the month, the day, and the time where the armies had engaged in the battle into the battle history field in association with army IDs of the armies that had engaged in battle.

On the other hand, when the game operation device 11 does not receive a battle command (NO in S523), the game operation device 11 terminates processing. FIG. 6 is a flow chart showing processing that is performed by the terminal device 12 and the game operation device 11 when depositing virtual currency, when purchasing an item, when updating a deposit, and upon a refund. The flow chart shown in FIG. 6 is a continuation of the flow chart shown in FIG. 5.

First, when the terminal device 12 accepts an input of a deposit instruction for depositing virtual currency from a game player (YES in S601), the terminal device 12 transmits a deposit command to the game operation device 11 (S602). On the other hand, when the terminal device 12 does not accept an input of a deposit instruction from the game player (NO in S601), the terminal device 12 advances processing to S603.

When the game operation device 11 receives the deposit command (YES in S621), the game operation device 11 updates the deposit information database shown in FIG. 4 according to the deposit command (S622). On the other hand, when the game operation device 11 does not receive a deposit command (NO in S621), the game operation device 11 advances processing to S623.

Accordingly, a game player makes a deposit of virtual currency. Thereafter, the game operation device 11 prohibits the game player from using the deposited virtual currency until the deposit period expires.

Next, when the terminal device 12 accepts an input of an item purchase instruction for purchasing an item from the game player (YES in S603), the terminal device 12 transmits an item purchase command to the game operation device 11 (S604). On the other hand, when the terminal device 12 does not accept an input of an item purchase instruction from the game player (NO in S603), the terminal device 12 advances processing to S605.

When the game operation device 11 receives the item purchase command (YES in S623), the game operation device 11 judges whether or not a deposit period is in force (S624). In this case, the game operation device 11 may judge that a deposit period is in force if a record of the game player having inputted the item purchase instruction exists in the deposit information database.

When the game operation device 11 judges that a deposit period is in force (YES in S624), the game operation device 11 prohibits purchasing of items by the game player (S626). In this case, since a deposit period is in force, the game operation device 11 may cause the terminal device 12 to display a screen notifying the game player that items cannot be purchased.

Moreover, even if a deposit period is in force, if the game player possesses virtual currency that has not been deposited and the amount of virtual currency is greater than a purchase price of an item, the game operation device 11 may allow the purchase of the item.

On the other hand, when the game operation device 11 judges that a deposit period is not in force (NO in S624), the game operation device 11 allows the purchase of the item if the amount of virtual currency possessed by the game player is greater than a price of the item which the game player wishes to purchase (S625).

Moreover, when the game operation device 11 does not receive an item purchase command (NO in S623), the game operation device 11 advances processing to S627.

When the terminal device 12 accepts an input of a deposit update instruction for updating a deposit from the game player (YES in S605), the terminal device 12 transmits a deposit update command to the game operation device (S606). On the other hand, when the terminal device 12 does not accept an input of a deposit update instruction (NO in S605), the terminal device 12 advances processing to S607.

When the game operation device 11 receives the deposit update command (YES in S627), the game operation device 11 updates the deposit information database (S628). Specifically, the deposit managing unit 22 of the game operation device 11 adds an increased amount of the deposit amount indicated by the deposit update command to a current deposit amount, and updates the deposit amount in the deposit amount field of the game player having inputted the deposit update instruction by a deposit amount after the addition. In addition, the deposit managing unit 22 updates a deposit start date of the deposit period of the game player having inputted the deposit update instruction by setting a reception date of the deposit update command as a start date of the deposit period. Furthermore, the deposit managing unit 22 updates a deposit end date in the record of the game player having inputted the deposit update instruction by setting, as the deposit end date, a date obtained by adding the deposit period indicated by the deposit update instruction to the updated deposit start date.

When the terminal device 12 accepts an input of a refund instruction for requesting a refund of deposited virtual currency from the game player (YES in S607), the terminal device 12 transmits a refund command to the game operation device 11 (S608). On the other hand, when the terminal device 12 does not accept an input of a refund instruction (NO in S607), the terminal device 12 advances processing to S701 in FIG. 7.

When the game operation device 11 receives the refund instruction (YES in S629), the game operation device 11 updates the deposit information database by deleting the record of the game player having inputted the refund instruction from the deposit information database (S630). At this point, the deposit amount stored in the deleted record is written into the virtual currency field of the game player information database. Accordingly, the deposited virtual currency is refunded to the game player. On the other hand, when the game operation device 11 does not receive a refund instruction (NO in S629), the game operation device 11 advances processing to S721 in FIG. 7.

Figure 7:
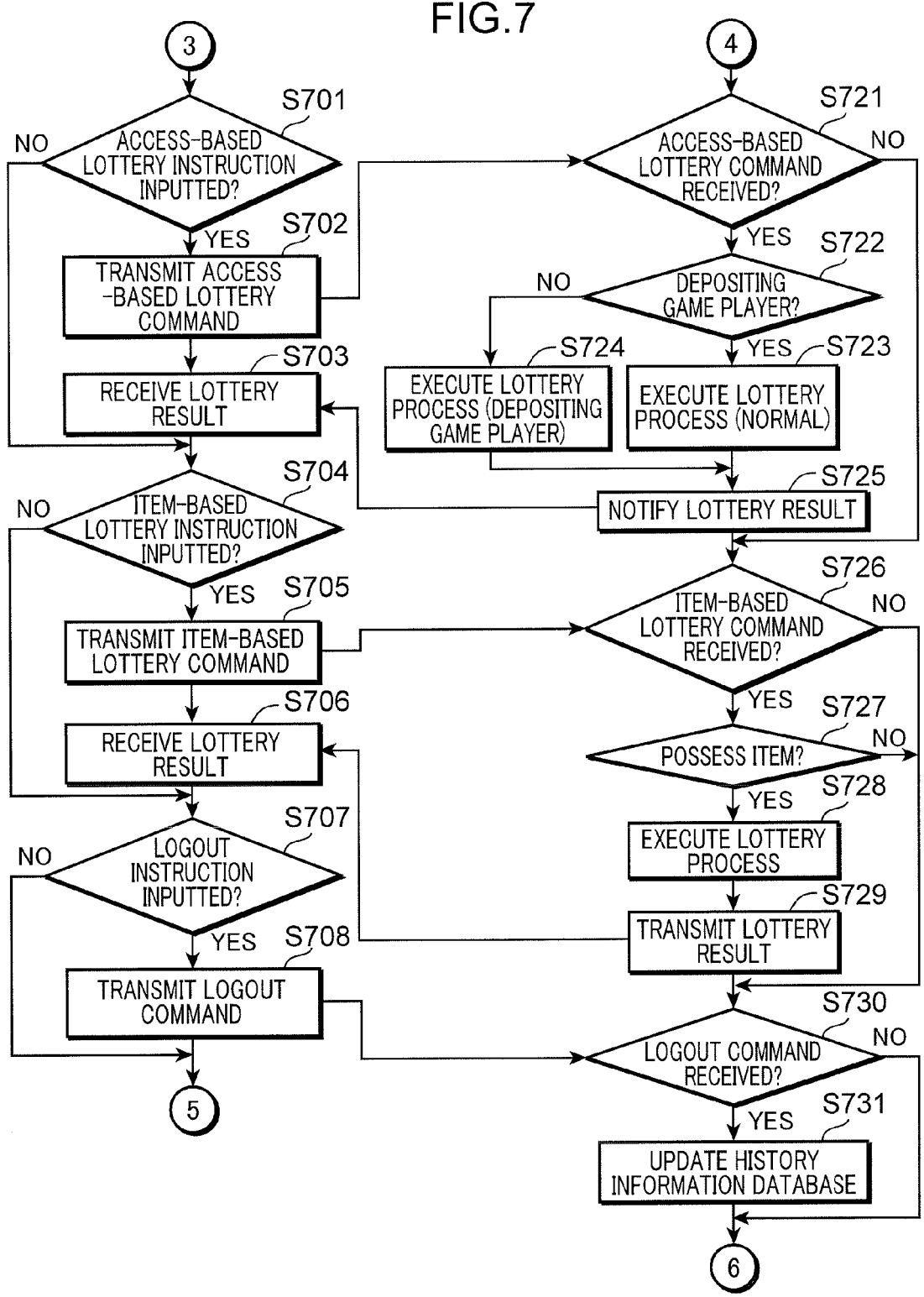
FIG. 7 is a flow chart showing processing that is performed by a terminal device and a game operation device when a lottery process is performed.

FIG. 7 is a flow chart showing processing that is performed by the terminal device 12 and the game operation device 11 when a lottery process is performed. This flow chart is a continuation of the flow chart shown in FIG. 6.

When the terminal device 12 accepts an input of a lottery instruction for causing the game operation device 11 to execute a lottery process based on an access from the game player (hereinafter referred to as an "access-based lottery instruction") (YES in S701), the terminal device 12 transmits a lottery command for causing the game operation device 11 to execute a lottery process based on an access (hereinafter referred to as an "access-based lottery command") to the game operation device 11 (S702).

Figure 13:
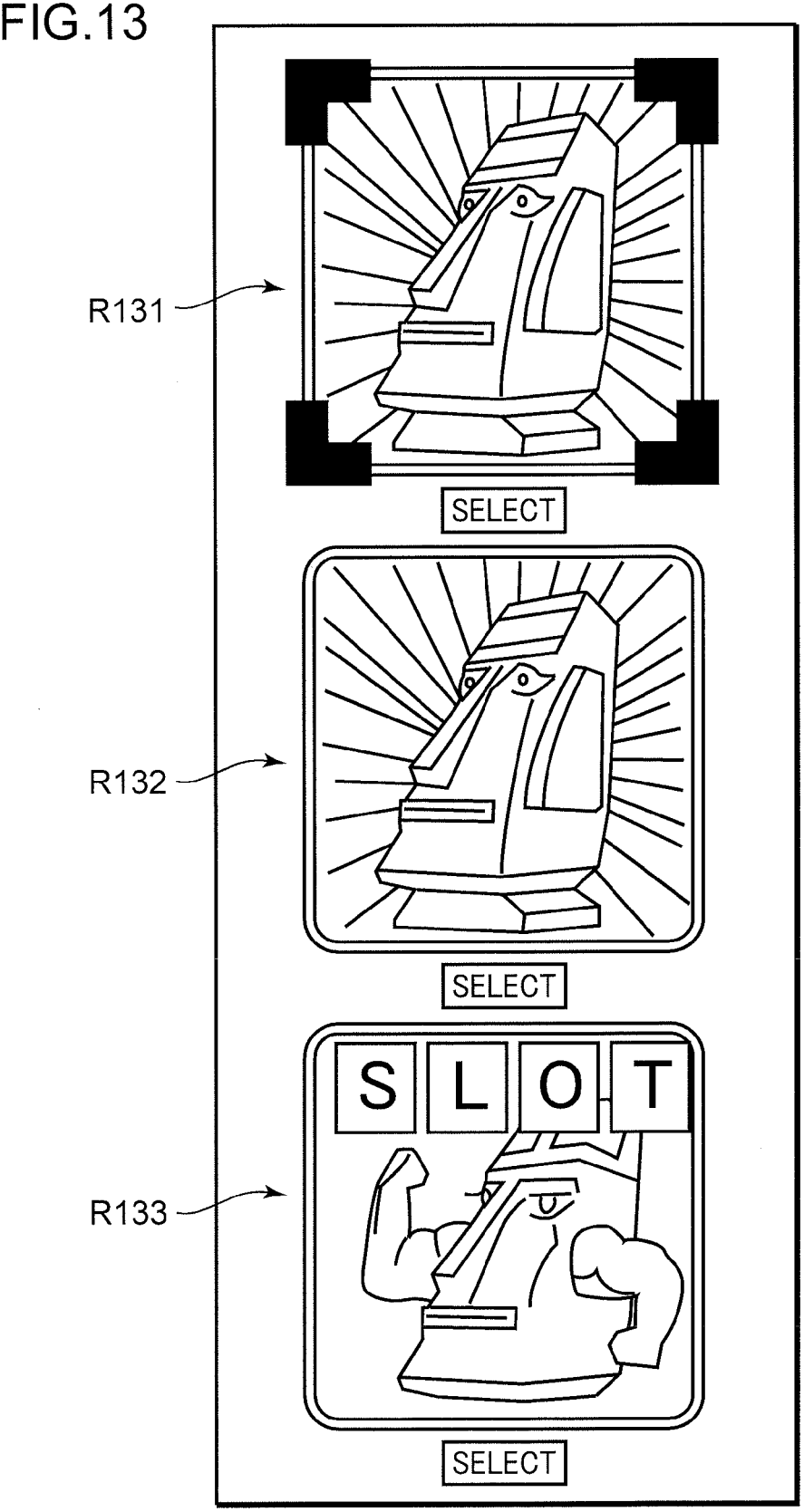
FIG. 13 is a diagram showing a selection screen in a lottery process.

At this point, when the "draw" button on the My Page screen shown in FIG. 10 is selected by the game player, a lottery process selection screen shown in FIG. 13 is displayed on the terminal device 12. The lottery process selection screen comprises three vertically-arranged image regions: R131, R132, and R133. The image region R131 is an image region that is used by a game player having purchased a card exchange item to request a lottery process that is executed by using the card exchange item (hereinafter, referred to as an "item-based lottery process"). The image region R132 is an image region that is used by a depositing game player to request an access-based lottery process. The image region R133 is an image region that is used by a normal game player to request an access-based lottery process. An image of a moai is displayed in each of the image regions R131 to R133. Decorative patterns are created on four corners of the image region R131 to create a luxurious look and to inform the game player of an item-based lottery process.

A description of "slot" is provided above the image region R133 to inform the game player of a lottery process based on an access by a normal game player.

Nothing is particularly displayed other than the moai in the image region R132 to inform the game player of a lottery process based on an access by a depositing game player.

A "select" button is displayed in each of the image regions R131 to R133, and by selecting the "select" button, a game player can request a lottery process.

When a game player having purchased a card exchange item requests a lottery process, an item-based lottery process can be requested by selecting the "select" button of the image region R131.

When a depositing game player requests an access-based lottery process, an access-based lottery process can be requested by selecting the "select" button of the image region R132. Moreover, a depositing game player can request an access-based lottery process at least once every day.

When a normal game player requests an access-based lottery process, an access-based lottery process can be requested by selecting the "select" button of the image region R132. Moreover, for example, a normal game player can request a lottery process when an energy value of an army possessed by the normal game player exceeds a certain value and cannot request a lottery process if the energy value does not exceed the certain value.

Returning to FIG. 7, when the game operation device 11 receives an access-based lottery command (YES in S721), the game operation device 11 judges whether or not the game player having inputted an access-based lottery instruction is a depositing game player (S722). When the game operation device 11 judges that the game player is a depositing game player (YES in S722), if one day or more has lapsed from the execution of a previous lottery process, the game operation device 11 sets a benefit offering probability based on a frequency, a deposit amount, and a deposit period of the depositing game player and executes a lottery process (S723).

On the other hand, when the game player having inputted the access-based lottery instruction is a normal game player (NO in S722), the game operation device 11 sets a benefit offering probability determined in advance for normal game players and executes a lottery process (S724). In this case, since the benefit offering probability for depositing game players is set to a value that is around 1,000 times higher than the benefit offering probability for normal game players, a depositing game player has a significantly higher probability of drawing a rare warlord card.

Next, the game operation device 11 transmits a lottery result to the terminal device 12 (S725). In this case, after presenting a screen production in which a warlord card is extracted from the mouth of the moai, the terminal device 12 displays an image of the warlord card obtained as a result of the lottery.

Figure 14:
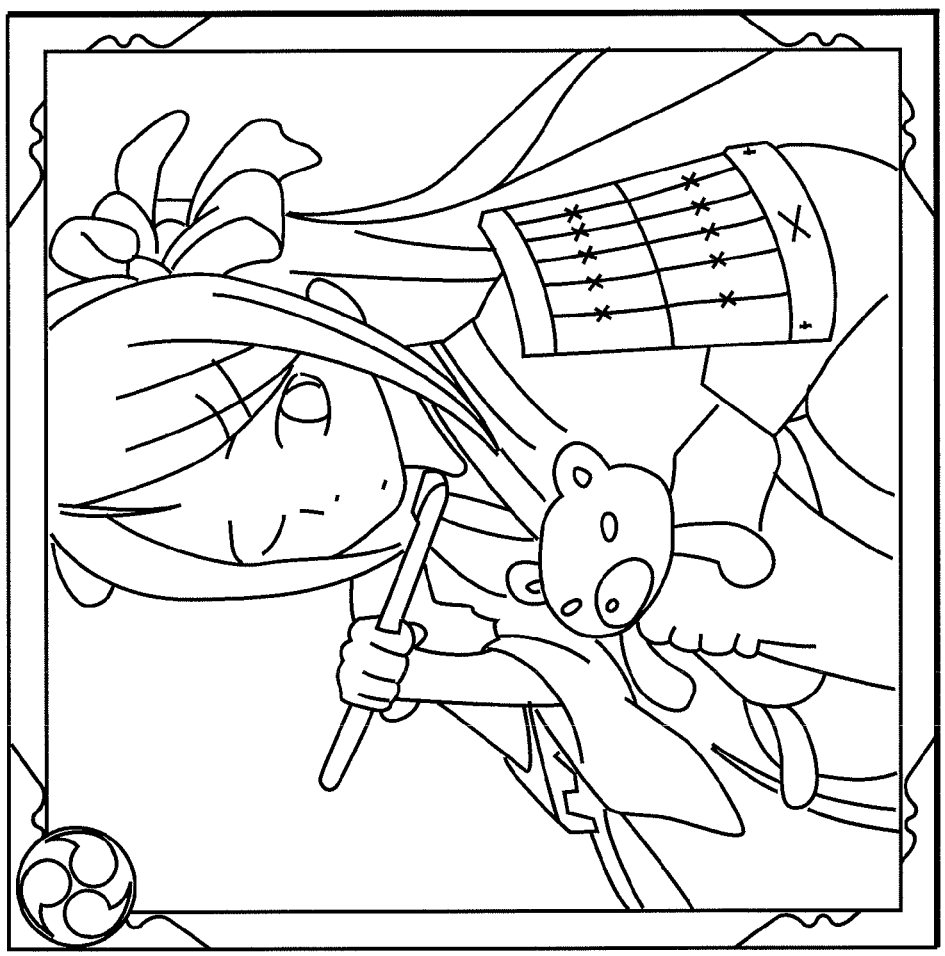
FIG. 14 is a diagram showing an image of a rare warlord card.
Figure 15:
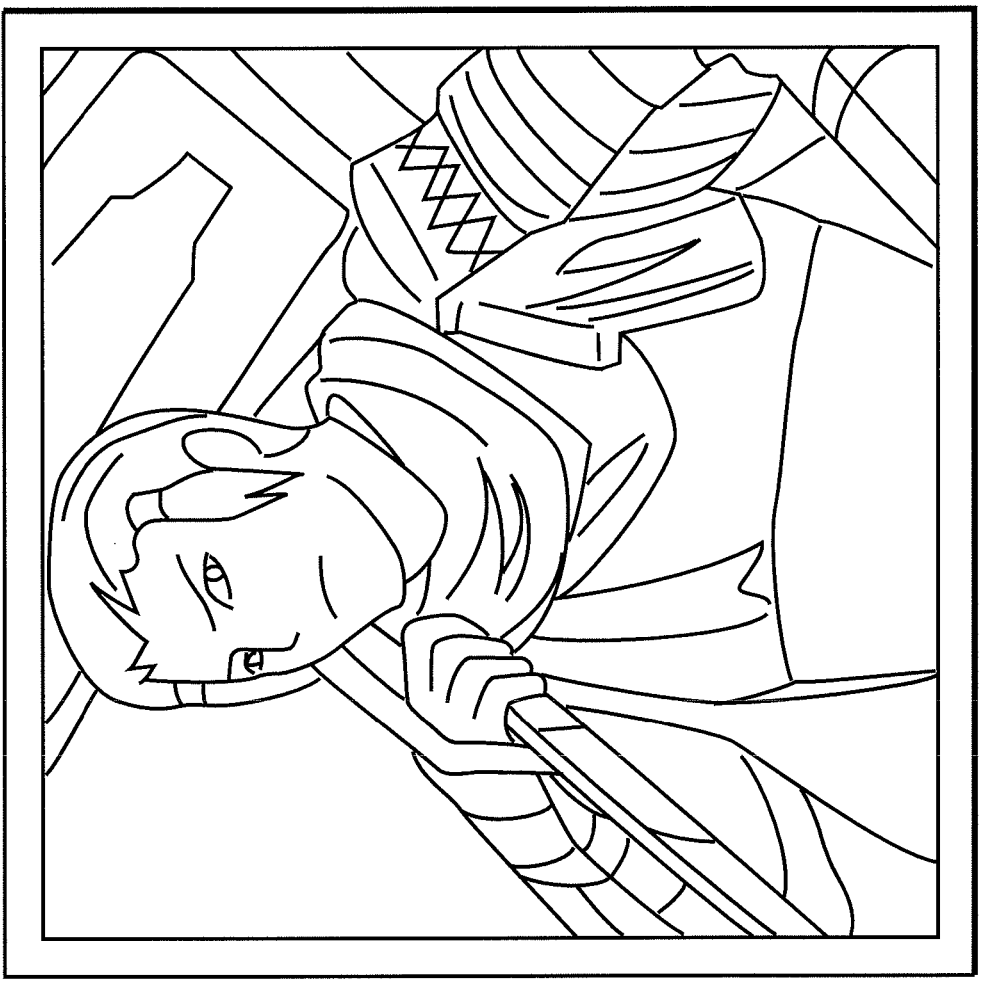
FIG. 15 is a diagram showing an image of a normal warlord card.

FIG. 14 is a diagram showing an image of a rare warlord card. FIG. 15 is a diagram showing an image of a normal warlord card. As shown in FIG. 14, a character image of a warlord is displayed in the image of the rare warlord card and, at the same time, four corners are decorated in gold or the like to create a "high-grade" aura. Accordingly, the game player can acknowledge that a rare warlord card has been obtained.

On the other hand, only an image representing a warlord character is displayed on a normal warlord card, and the absence of decorations such as those shown in FIG. 14 create an aura of a lesser grade than a rare warlord card.

Returning to FIG. 7, when the terminal device 12 accepts an input of an item-based lottery instruction from the game player (YES in S704), the terminal device 12 transmits an item-based lottery command to the game operation device 11 (S705). On the other hand, when the terminal device 12 does not accept an input of an item-based lottery instruction from the game player (NO in S704), the terminal device 12 advances processing to S707.

When the game operation device 11 receives an item-based lottery command (YES in S726), the game operation device 11 judges whether or not the game player having inputted an access-based lottery instruction possesses a lottery process request item by referring to the army information database shown in FIG. 4 (S727). Subsequently, when the game operation device 11 judges that the game player possesses a lottery process request item (YES in S727), the game operation device 11 sets a benefit offering probability determined in advance for an item-based lottery process and executes the lottery process (S728). In this case, a benefit offering probability is set at a higher value than the benefit offering probability set for depositing game players. Accordingly, when requesting an item-based lottery process, the probability of drawing a rare warlord card is higher than an access-based lottery process.

On the other hand, when the game operation device judges that the game player does not possess a lottery process request item (NO in S727), the game operation device does not perform a lottery process and advances processing to S730. Moreover, when the game operation device 11 does not receive an item-based lottery command (NO in S726), the game operation device 11 advances processing to S730.

Next, the game operation device 11 transmits a lottery result to the terminal device 12 (S729). Subsequently, the terminal device 12 receives the lottery result (S706). In this case, the terminal device 12 displays a warlord card obtained by the lottery process in a similar manner to S703.

Next, when the terminal device 12 accepts an input of a logout instruction from the game player (YES in S707), the terminal device 12 transmits a logout command to the game operation device 11 (S708) and returns processing to S503 shown in FIG. 5.

Subsequently, when the game operation device 11 receives the logout command from the terminal device 12 (YES in S730), the game operation device 11 writes in the year, the month, the day, and the time of reception of the logout command into the logout field of the game player in the history information database to update the history information database (S731), and returns processing to S521 shown in FIG. 5.

Figure 8:
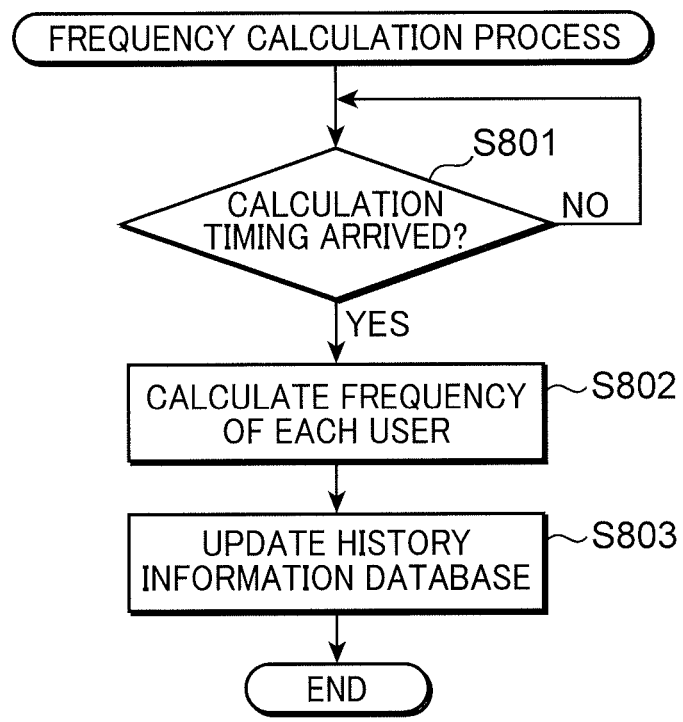
FIG. 8 is a flow chart showing a frequency calculation process.

A frequency calculation process by the game operation device 11 will now be described. FIG. 8 is a flow chart showing a frequency calculation process. First, when a frequency calculation timing arrives (YES in S801), the game operation device 11 calculates frequencies of all game players registered in the history information database shown in FIG. 4 (S802). In this case, a frequency calculation timing arrives once every day as described earlier. Since details of a frequency calculation process has been provided earlier, a description thereof will be omitted.

On the other hand, if a frequency calculation timing does not arrive (NO in S801), processing is returned to S801. Next, the game operation device 11 updates the history information database with the frequency calculated in S802 (S803) and ends the processing.

Moreover, while warlord cards offered by a lottery process has been divided into rare warlord cards and normal warlord cards in the embodiment described above, this configuration is not restrictive and rare warlord cards may be divided into a plurality of rare warlord cards according to card level values and normal warlord cards may be divided into a plurality of normal warlord cards according to card level values.

In this case, a probability of drawing a warlord card with a higher card level value can be set higher as a frequency, a deposit amount, or a deposit period of a depositing game player increases or extends.

In addition, in FIG. 10, when "card synthesis" is selected by a game player, the game operation device 11 may synthesize two warlord cards which are possessed and specified by the game player to newly generate a single warlord card. In this case, for example, an average value or the like of card basic values of the two warlord cards prior to synthesis may be adopted as a card basic value of the single newly generated warlord card, and a value equal to or greater than a sum of card level values of the two warlord cards prior to synthesis may be adopted as a card level value of the single newly generated warlord card.

Accordingly, the game player can possess a warlord card with a high card ability score and can further possess a larger number of other warlord cards since a total value of card basic values of warlord cards currently possessed by the game player decreases compared to prior to the synthesis. Therefore, the game player can further increase a total value of card level values of his/her own army and can gain an advantage in battles.

Moreover, for example, the game player managing unit 21 to the army managing unit 25 shown in FIG. 2 are constituted by program modules included in a game operation program which is stored in a storage device (not shown) and which causes a computer to function as the game operation device 11, and are realized as the game modules are loaded to a CPU. In addition, for example, the game information storage unit 26 shown in FIG. 2 is constituted by data included in the game operation program and is realized as the data is loaded to a RAM. Furthermore, for example, the communicating unit 27 is constituted by a communication circuit and a program module included in the game operation program that controls the communication circuit. Moreover, the game control program may be recorded on a computer-readable recording medium such as a DVD-ROM and provided to a user. In this case, the recording medium on which the game operation program is recorded may be inserted into a computer so as to have the computer read and execute the game operation program from the recording medium.

Furthermore, in the present embodiment, instead of mounting the respective blocks shown in FIG. 2 on a single computer, the respective blocks may be distributed to and mounted on a plurality of computers to configure the game operation device 11 as game operation system constituted by the plurality of computers. Furthermore, the respective blocks shown in FIG. 11 may be constituted by an integrated circuit.

(Summary of Game Operation Device According to an Embodiment of the Present Invention)

(1) A game operation device according to an embodiment of the present invention is a game operation device for operating a game played through connection via a predetermined communications line to a terminal device manipulated by a game player and which causes assemblies consisting of a plurality of units set in a game space to engage in battle with each other, the game operation device comprising: a deposit managing unit which deposits a virtual currency usable in the game space according to a deposit command issued by the game player and transmitted from the terminal device and which prohibits use of the deposited virtual currency by the game player until a predetermined deposit period expires; and a benefit offering unit which offers, until the deposit period expires, a benefit that gives a higher advantage to the game player in the battle when the game player deposits the virtual currency in comparison to a case where the game player does not deposit the virtual currency.

Moreover, since a game operation method, a game operation program, and a game operation system according to embodiments of the present invention share the same configuration as the game operation device, descriptions thereof will be omitted.

First, this configuration enables depositing as a variation in the use of virtual currency that differs from purchasing items such as provided in conventional games. In addition, when a game player deposits virtual currency, a benefit that gives the game player an advantage in battle is offered in comparison to a case where a deposit is not made. Meanwhile, the use of the deposited virtual currency is prohibited until a deposit period expires.

As described above, while billing is performed in the form of depositing according to the present configuration, a game player gains the following advantages which are not offered by conventional games. First, a game player gains i) a deposit (corresponding to the amount of virtual currency applied) and ii) a benefit. In this case, while a restriction applies in that the virtual currency applied to the deposit described in i) cannot be used until the deposit period expires (in other words, the virtual currency applied to the deposit cannot be devoted to purchasing an item or the like during the deposit period), since the virtual currency does not decrease, the virtual currency is substantially retained, albeit in another form. On that basis, the benefit described in ii) can be enjoyed for the duration of the deposit period. In other words, the game player can gain the benefit without substantially reducing his/her own virtual currency. Moreover, once the deposit period expires, the benefit described in ii) is no longer offered.

In this case, the benefit can take a wide variety of forms. For example, if the game involves match-ups between teams, the benefit may take the form of increasing a probability of acquiring a strong character as a member that makes up the team or reducing the time required to restore hit points.

As described above, while conventional games only offer options for purchasing items or the like when spending virtual currency (getting billed) in order to improve abilities, the present configuration provides a new option that enables items to be purchased (at arbitrary timings) in addition to enjoying benefits within a predetermined period (deposit period).

As a result, even if resources of a game player for purchasing items are limited, for example, the willingness of the game player to aim for a higher ranking can be aroused from a state where no consideration has been given to using virtual currency and the game player can be motivated to consider the use of virtual currency. Therefore, an entire game community can be stimulated and, by extension, an attractive game with sufficient charm and appeal can be realized.

Moreover, the present configuration also provides a game provider who manages the game operation device with the following advantages. Specifically, a restriction is applied in which a deposit cannot be applied to purchasing items or the like until a deposit period expires. However, a game player may conceivably come across an item that he/she strongly wishes to purchase during a deposit period. In such a case, the game player may possibly purchase the item using virtual currency anew outside of the deposit. This means that the game provider is presented with two billing opportunities, namely, depositing and the purchasing of items. As a result, the amount billable to a game player increases and a greater revenue can be earned.

(2) Favorably, a frequency managing unit which manages a frequency at which the game player has executed the game is further provided, and the benefit offering unit reduces a benefit offered to the game player as the frequency declines.

According to this configuration, when a frequency at which the game is executed by a game player who has deposited virtual currency declines, the benefit is reduced. Therefore, in order to enjoy the benefit obtained by making a deposit, the game player must endeavor to prevent the frequency at which the game is executed from declining. In other words, according to the present configuration, although advantages are offered, there are also conditions that must be met in order to enjoy those advantages. As a result, there is depth in play and a game with charm and appeal can be realized. On the other hand, for a game provider, since continuous access to the game by a game player results in increasing billing opportunities, there is an advantage of increased revenue.

(3) Favorably, when the declined frequency shifts to increase, the benefit offering unit suppresses the reduction of the benefit offered to the game player.

According to this configuration, even when a depositing game player had not played the game for a while and the benefit has declined, the benefit can be restored by increasing the number of game executions. As a result, a depositing game player can be motivated to increase the number of game executions and can be prevented from staying away from the game.

(4) Favorably, the deposit managing unit reduces a deposit amount of the virtual currency deposited by the game player as the frequency declines.

According to this configuration, when a frequency at which the game is executed by a depositing game player declines, a deposit amount of the deposited virtual currency is reduced. Therefore, the depositing game player naturally endeavors to maintain the frequency at which the game is executed. In other words, according to the present configuration, although advantages are offered, there are also conditions that must be met in order to enjoy those advantages. As a result, there is depth in play and a game with charm and appeal can be realized. On the other hand, for a game provider, since continuous access to the game by a game player results in increasing billing opportunities, there is an advantage of increased revenue.

(5) Favorably, when the declined frequency shifts to increase, the deposit managing unit restores the reduced deposit amount of the virtual currency.

According to this configuration, even if a depositing game player allows his/her deposit amount to be reduced due to a decrease in frequency, the depositing game player can once again restore the deposit amount to its original value by increasing the number of game executions and therefore increasing the frequency. Accordingly, a depositing game player can be motivated to increase the number of game executions in order to restore his/her deposit amount to its original value and the depositing game player can be prevented from staying away from the game.

(6) Favorably, when a refund command for refunding the deposited virtual currency is received from the terminal device of the game player before the deposit period expires, the deposit managing unit reduces the deposit amount and refunds the virtual currency to the game player, and the virtual currency is refunded to the game player by increasing the reduced amount from the deposit amount as a period of time between the time of reception of the refund command to the time of expiration of the deposit period extends.

According to this configuration, since the refund amount is reduced from the deposit amount when the depositing game player closes out his/her deposit before the deposit period expires, a depositing game player can be motivated not to close out his/her deposit before the deposit period expires.

For example, cases where a depositing game player may attempt to close out his/her deposit includes a case where the depositing game player comes across an item that he/she strongly wishes to purchase using virtual currency. In this case, if the depositing game player is allowed to close out his/her deposit to obtain a full refund of the deposited virtual currency and to purchase a desired item without consequences, the whole significance of providing a deposit is lost. On the other hand, as is the case of the present configuration, by imposing a penalty on a depositing game player of reducing the deposit amount if the deposit is withdrawn, the depositing game player does not withdraw his/her deposit but separately uses virtual currency that is in his/her possession or converts cash into virtual currency instead, and attempts to purchase an item using the virtual currency. As a result, revenue of the game operating company can be increased.

(7) Favorably, when a deposit update command for increasing the deposit amount is received from the terminal device of the game player during the deposit period, the deposit managing unit adds an increased amount specified in the deposit update command to the current deposit amount without reducing the current deposit amount, sets the sum as the updated deposit amount, and starts counting the deposit period, with the time of reception of the deposit update command being used as a reference.

Since the benefit increases as the deposit amount increases, a depositing game player may wish to increase the deposit amount during the deposit period. For example, there may be a case where a depositing game player may wish to increase a current deposit amount of 1,000 yen to 5,000 yen.

In this case, a configuration in which the deposit is first withdrawn and 5,000 yen is then deposited anew causes the depositing game player a loss since the refund amount is reduced from the original deposit amount if the deposit is withdrawn before the deposit period expires as described in (6) above and the depositing game player must pay additional money of 4,000 yen or more in order to restore the deposit amount to 5,000 yen.

In consideration thereof, by transmitting a deposit update command, the depositing game player is able to deposit 5,000 yen by simply adding 4,000 yen to 1,000 yen that is the deposit amount. Accordingly, the depositing game player can increase the deposit amount without taking a loss even during the deposit period.

In this case, allowing the deposit period to expire at an original deposit end date after the deposit update command is transmitted results in reducing a period over which the depositing game player is eligible for a benefit worth 5,000 yen. In consideration thereof, by setting the time at which the deposit update command had been transmitted as the start time of the deposit period and recounting the deposit period, the period over which the depositing game player is eligible for a benefit worth 5,000 yen can be extended. As a result, the depositing game player can be motivated to transmit a deposit update command to increase his/her deposit amount.

In addition, since a configuration is adopted in which the refund amount is reduced as a period of time between the deposit period and withdrawal shortens, if the deposit end date is near, a game player can be presented with the options of purchasing an item by withdrawing his/her deposit even if doing so results in a slight loss or purchasing the item by separately converting cash into virtual currency. Therefore, the appeal of the game can be enhanced. Furthermore, even when a game player comes across an item that he/she strongly wishes to purchase, since the deposit amount is to be refunded in full by waiting a little longer to withdraw his/her deposit, an option of waiting a little longer to withdraw his/her deposit can be provided to the game player. Therefore, a greater variation in decision making can be presented to the game player.

(8) Favorably, the units include virtual cards, the virtual cards include a first virtual card for increasing an ability score of the assembly and a second virtual card for increasing the ability score of the assembly more significantly than the first virtual card, the benefit offering unit executes a lottery process for determining which virtual card, between the first virtual card and the second virtual card, is to be offered before the deposit period expires to a game player having deposited the virtual currency based on an access to the game operation device, and a benefit offering probability set in the lottery process is set higher when the game player has deposited the virtual currency in comparison to a case where the game player has not deposited the virtual currency.

According to this configuration, since a benefit offering probability for drawing the second virtual card is set higher for a depositing game player in comparison to a case where a deposit is not made, the second virtual card can be obtained at a higher probability.

(9) Favorably, the game player is capable of purchasing a lottery process request item for requesting an execution of the lottery process using virtual currency other than the deposited virtual currency, the benefit offering unit sets the benefit offering probability and executes the lottery process according to the set benefit offering probability when the lottery process request item is used by the game player, and the benefit offering probability that is set in the lottery process based on the use of the lottery process request item is set higher than a maximum value of a benefit offering probability set in a lottery process that is executed based on the access.

According to this configuration, since the benefit offering probability that is set for a lottery process based on the use of the lottery process request item is set higher than the benefit offering probability set for a lottery process that is executed based on an access, a decline in a buying motivation of game players towards lottery process request items can be prevented.

(10) Favorably, an assembly managing unit is further provided which causes the assemblies to engage in the battle with each other in the game space, determines a winning assembly and a losing assembly by comparing ability scores of the assemblies, and reduces the ability score of at least the losing assembly based on the determined outcome, the assembly managing unit restores the ability score of the assembly at a predetermined recovery rate over time when the game player is not executing the game, and the benefit offering unit sets the recovery rate higher when the game player has deposited the virtual currency in comparison to a case where the game player has not deposited the virtual currency.

According to this configuration, since the recovery rate is set higher for a depositing game player compared to a game player who has not made a deposit, a depositing game player can restore an ability score more rapidly. As a result, a game player can be motivated to deposit virtual currency.

(11) Favorably, a money item that virtually represents money possessed by the assemblies is further provided, the assembly managing unit transfers a money item possessed by the assembly, which has lost the battle, to the assembly, which has won the battle, by increasing a value indicated by the money item by a predetermined amplification factor, and the benefit offering unit increases the amplification factor higher when the game player has deposited the virtual currency in comparison to a case where the game player has not deposited the virtual currency.

According to this configuration, when the assembly of a depositing game player wins a battle, the depositing game player obtains a money item that is greater in value than the money item possessed by the opposing assembly. As a result, a game player can be motivated to deposit virtual currency.

The present application is based on and claims the benefit of Japanese Patent Application No. 2011-106007, filed before the Japan Patent Office on May 11, 2011, the content of which is hereby incorporated by reference in its entirety.

The invention claimed is:

1. A game operation device for operating a game played through connection via a predetermined communications line to a terminal device manipulated by a game player and which causes assemblies consisting of a plurality of units set in a game space to engage in battle with each other, the game operation device comprising:
a deposit managing unit which deposits a virtual currency usable in the game space according to a deposit command issued by the game player and transmitted from the terminal device and which prohibits use of the deposited virtual currency by the game player until a predetermined deposit period expires; and
a benefit offering unit which offers, until the deposit period expires, a benefit that gives a higher advantage to the game player in the battle when the game player deposits the virtual currency in comparison to a case where the game player does not deposit the virtual currency,
wherein when a refund command for refunding the deposited virtual currency is received from the terminal device of the game player before the deposit period expires, the deposit managing unit performs a reduction of the deposit amount to a reduced amount and refunds virtual currency in an amount equal to the reduced amount to the game player, wherein an amount of the reduction of the deposit amount is based on an amount of time remaining from the time of reception of the refund command to the time of expiration of the deposit period such that the longer the amount of time remaining the greater the amount of the reduction and the shorter the amount of time remaining the lesser the amount of the reduction.

2. The game operation device according to claim 1, wherein when a deposit update command for increasing the deposit amount is received from the terminal device of the game player during the deposit period, the deposit managing unit adds an increased amount specified in the deposit update command to the current deposit amount without reducing the current deposit amount, sets the sum as the updated deposit amount, and starts counting the deposit period, with the time of reception of the deposit update command being used as a reference.

3. A non-transitory computer-readable recording medium which stores a game operation program, the game operation program causing a computer to function as the operation device according to claim 1.

4. A game operation device for operating a game played through connection via a predetermined communications line to a terminal device manipulated by a game player and which causes assemblies consisting of a plurality of units set in a game space to engage in battle with each other, the game operation device comprising:
a deposit managing unit which deposits a virtual currency usable in the game space according to a deposit command issued by the game player and transmitted from the terminal device and which prohibits use of the deposited virtual currency by the game player until a predetermined deposit period expires; and
a benefit offering unit which offers, until the deposit period expires, a benefit that gives a higher advantage to the game player in the battle when the game player deposits the virtual currency in comparison to a case where the game player does not deposit the virtual currency, wherein
the units include virtual cards,
the virtual cards include a first virtual card for increasing an ability score of the assembly and a second virtual card for increasing the ability score of the assembly more significantly than the first virtual card,
the benefit offering unit executes a lottery process for determining which virtual card, between the first virtual card and the second virtual card, is to be offered before the deposit period expires to a game player having deposited the virtual currency based on an access to the game operation device, and
a benefit offering probability set in the lottery process is set higher when the game player has deposited the virtual currency in comparison to a case where the game player has not deposited the virtual currency.

5. The game operation device according to claim 4, wherein
the game player is capable of purchasing a lottery process request item for requesting an execution of the lottery process using virtual currency other than the deposited virtual currency,
the benefit offering unit sets the benefit offering probability and executes the lottery process according to the set benefit offering probability when the lottery process request item is used by the game player, and
the benefit offering probability that is set in the lottery process based on the use of the lottery process request item is set higher than a maximum value of a benefit offering probability set in a lottery process that is executed based on the access.

6. A game operation device for operating a game played through connection via a predetermined communications line to a terminal device manipulated by a game player and which causes assemblies consisting of a plurality of units set in a game space to engage in battle with each other,
the game operation device comprising:
a deposit managing unit which deposits a virtual currency usable in the game space according to a deposit command issued by the game player and transmitted from the terminal device and which prohibits use of the deposited virtual currency by the game player until a predetermined deposit period expires;
a benefit offering unit which offers, until the deposit period expires, a benefit that gives a higher advantage to the game player in the battle when the game player deposits the virtual currency in comparison to a case where the game player does not deposit the virtual currency; and
an assembly managing unit which causes the assemblies to engage in the battle with each other in the game space, determines a winning assembly and a losing assembly by comparing ability scores of the assemblies, and reduces the ability score of at least the losing assembly based on the determined outcome, wherein
the assembly managing unit restores the ability score of at least the losing assembly at a predetermined recovery rate over time when the game player is not executing the game, and
the benefit offering unit sets the recovery rate higher when the game player has deposited the virtual currency in comparison to a case where the game player has not deposited the virtual currency.

7. The game operation device according to claim 6, further comprising a money item that virtually represents money possessed by the assemblies, wherein
the assembly managing unit transfers a money item possessed by the assembly that has lost the battle, to the assembly that has won the battle, by increasing a value indicated by the money item by a predetermined amplification factor, and
the benefit offering unit increases the amplification factor higher when the game player has deposited the virtual currency in comparison to a case where the game player has not deposited the virtual currency.

* * * * *